(12) United States Patent
Takaoka

(10) Patent No.: US 12,012,729 B2
(45) Date of Patent: Jun. 18, 2024

(54) SYSTEM AND METHOD FOR AUTOMATICALLY CONTROLLING WORK MACHINE INCLUDING WORK IMPLEMENT

(71) Applicant: KOMATSU LTD., Tokyo (JP)

(72) Inventor: Yukihisa Takaoka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 605 days.

(21) Appl. No.: 17/274,589

(22) PCT Filed: Sep. 17, 2019

(86) PCT No.: PCT/JP2019/036389
§ 371 (c)(1),
(2) Date: Mar. 9, 2021

(87) PCT Pub. No.: WO2020/105262
PCT Pub. Date: May 28, 2020

(65) Prior Publication Data
US 2022/0049473 A1    Feb. 17, 2022

(30) Foreign Application Priority Data
Nov. 19, 2018    (JP) ................ 2018-216704

(51) Int. Cl.
*E02F 9/26*    (2006.01)
*E02F 3/84*    (2006.01)
(Continued)

(52) U.S. Cl.
CPC .............. *E02F 9/262* (2013.01); *E02F 3/844* (2013.01); *E02F 9/205* (2013.01); *G05D 1/021* (2013.01)

(58) Field of Classification Search
CPC . E02F 9/262; E02F 3/844; E02F 9/205; E02F 3/841; E02F 9/2228; E02F 9/265;
(Continued)

(56) References Cited

U.S. PATENT DOCUMENTS 5,462,122 A    10/1995    Yamamoto et al.
9,469,967 B2   10/2016    Edara et al.
(Continued)

FOREIGN PATENT DOCUMENTS

JP    7-26586 A    1/1995
JP    2011-196457 A    10/2011
(Continued)

OTHER PUBLICATIONS

Stewart, Larry; Maximize Dozer Operations; Sep. 28, 2010 (Year: 2010).*
(Continued)

*Primary Examiner* — Alan D Hutchinson
(74) *Attorney, Agent, or Firm* — Global IP Counselors, LLP

(57) ABSTRACT

A system controls a work machine including a work implement. The system includes a load sensor and a processor. The load sensor detects a load acting on the work implement. The processor controls the work machine to dig a digging wall formed between adjacent slots. The processor moves the work machine to either one of the adjacent slots adjacent to the digging wall when the load during digging the digging wall is equal to or greater than a first threshold. A method is executed by a processor to control the work machine. The method includes detecting a load acting on the work implement, controlling the work machine to dig the digging wall, and moving the work machine to one of the adjacent slots when the load during digging the digging wall is equal to or greater than a first threshold.

20 Claims, 18 Drawing Sheets

(51) Int. Cl.
*E02F 9/20* (2006.01)
*G05D 1/00* (2024.01)
(58) Field of Classification Search
CPC .................. E02F 3/7618; G05D 1/021; G05D 2201/0202
See application file for complete search history.

(56) References Cited

U.S. PATENT DOCUMENTS

| | | |
|---|---|---|
| 2014/0257646 A1 | 9/2014 | Ishibashi et al. |
| 2016/0076224 A1* | 3/2016 | Edara .................... E02F 9/2029 701/50 |
| 2017/0204589 A1 | 7/2017 | Ohira et al. |

FOREIGN PATENT DOCUMENTS

| | | |
|---|---|---|
| WO | 2014/136278 A1 | 9/2014 |
| WO | 2016/088904 A1 | 6/2016 |

OTHER PUBLICATIONS

The Office Action for the corresponding Canadian application No. 3,112,158, issued on May 20, 2022.
L. Stewart, "Maximize Dozer Operations.", made public on Sep. 28, 2010, URL: <https://www.constructionequipment.com/doze-more-dirt>.
The International Search Report for the corresponding international application No. PCT/JP2019/036389, issued on Dec. 17, 2019.

* cited by examiner

_US 12,012,729 B2_

SYSTEM AND METHOD FOR AUTOMATICALLY CONTROLLING WORK MACHINE INCLUDING WORK IMPLEMENT

CROSS-REFERENCE TO RELATED APPLICATIONS

This application is a U.S. National stage application of International Application No. PCT/JP2019/036389, filed on Sep. 17, 2019. This U.S. National stage application claims priority under 35 U.S.C. § 119(a) to Japanese Patent Application No. 2018-216704, filed in Japan on Nov. 19, 2018, the entire contents of which are hereby incorporated herein by reference.

BACKGROUND

Field of the Invention

The present invention relates to a system and a method for automatically controlling a work machine including a work implement.

Background Information

A technique for performing automatic control on a work machine such as a bulldozer includes been disclosed in the prior art. For example, in U.S. Pat. No. 9,469,967, a dig starting condition for digging a digging wall is determined by a controller based on information of the adjacent slots formed on both sides of the digging wall.

SUMMARY

In the above work machine, for example, the dig starting condition such as a dig-starting position for digging the digging wall is determined based on the difference in the elevations of the adjacent slots or an offset between starting edge positions or the like. However, while the prior art indicates that the digging of the digging wall can be started, the dig operations for digging the digging wall are not described.

An object of the present invention is to provide a system and a method for automatically digging a digging wall.

A system according to a first aspect is a system for controlling work machine including a work implement. The system includes a load sensor and a processor. The load sensor is configured to detect a load acting on the work implement. The processor is configured to control the work machine to dig a digging wall formed between a plurality of slot. The processor is configured to move the work machine to either one of an adjacent slot adjacent to the digging wall when the load during digging the digging wall is equal to or greater than a first threshold.

A method according to a second aspect is a method executed by a processor for controlling a work machine including a work implement. The method includes the following processes. A first process includes detecting a load acting on the work implement. A second process includes controlling the work machine to dig digging wall formed between a plurality of slots. A third process includes moving the work machine to either one of an adjacent slot adjacent to the digging wall when the load during digging the digging wall is equal to or greater than a first threshold.

In the present invention, the work machine is able to automatically dig the digging wall. In addition, when the load becomes equal to or greater than the first threshold during digging the digging wall, the load acting on the work implement can be reduced because the work machine moves to either one of the adjacent slots.

DETAILED DESCRIPTION OF EMBODIMENT(S)

(Outline Configuration of Work Machine)

Figure 1:
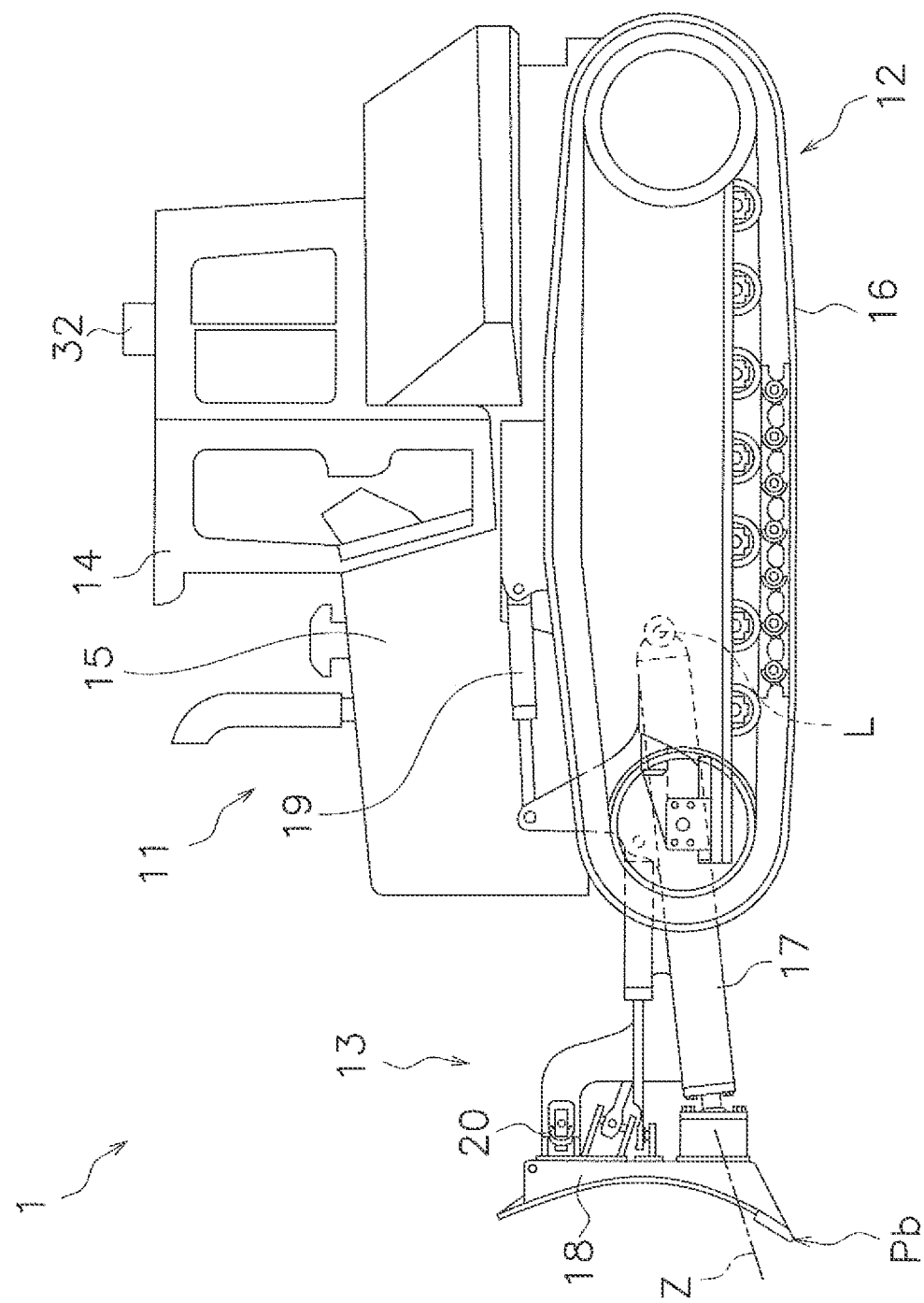
FIG. 1 is a side view of a work machine according to the present embodiment.

A work machine 1 according to the present embodiment is a bulldozer. The work machine 1 includes a vehicle body 11, a travel device 12, and a work implement 13 as illustrated in FIG. 1.

The vehicle body 11 includes an operator's cab 14 and an engine compartment 15. An operator's seat which is not illustrated is disposed inside the operator's cab 14. The engine compartment 15 is disposed in front of the operator's cab 14. The travel device 12 is attached to a bottom portion of the vehicle body 11. The travel device 12 includes a pair of left and right crawler belts 16. The work machine 1 travels due to the rotation of the pair of crawler belts 16. Only the crawler belt 16 on the left side is illustrated in FIG. 1 and the crawler belt on the right side is omitted.

The work implement 13 is attached to the vehicle body 11. The work implement 13 includes a lift frame 17, a blade 18, a lift cylinder 19, and a tilt cylinder 20. The lift frame 17 is attached to the vehicle body 11 in a manner that allows movement up and down centered on an axis L that extends in the vehicle width direction. The lift frame 17 supports the blade 18.

The blade 18 is disposed in front of the vehicle body 11. The blade 18 moves up and down accompanying the up and down movements of the lift frame 17. The lift frame 17 may be attached to the travel device 12. The lift cylinder 19 is coupled to the vehicle body 11 and the lift frame 17. Due to the extension and contraction of the lift cylinder 19, the lift frame 17 moves up and down centered on an axis X.

The tilt cylinder 20 is coupled to the lift frame 17 and the blade 18. The tilt cylinder 20 extends and contracts whereby the blade 18 tilts around an axis Z that extends in the front-back direction of the work machine 1.

(Drive System and Control System of Work Machine)
(Drive System)

Figure 2:
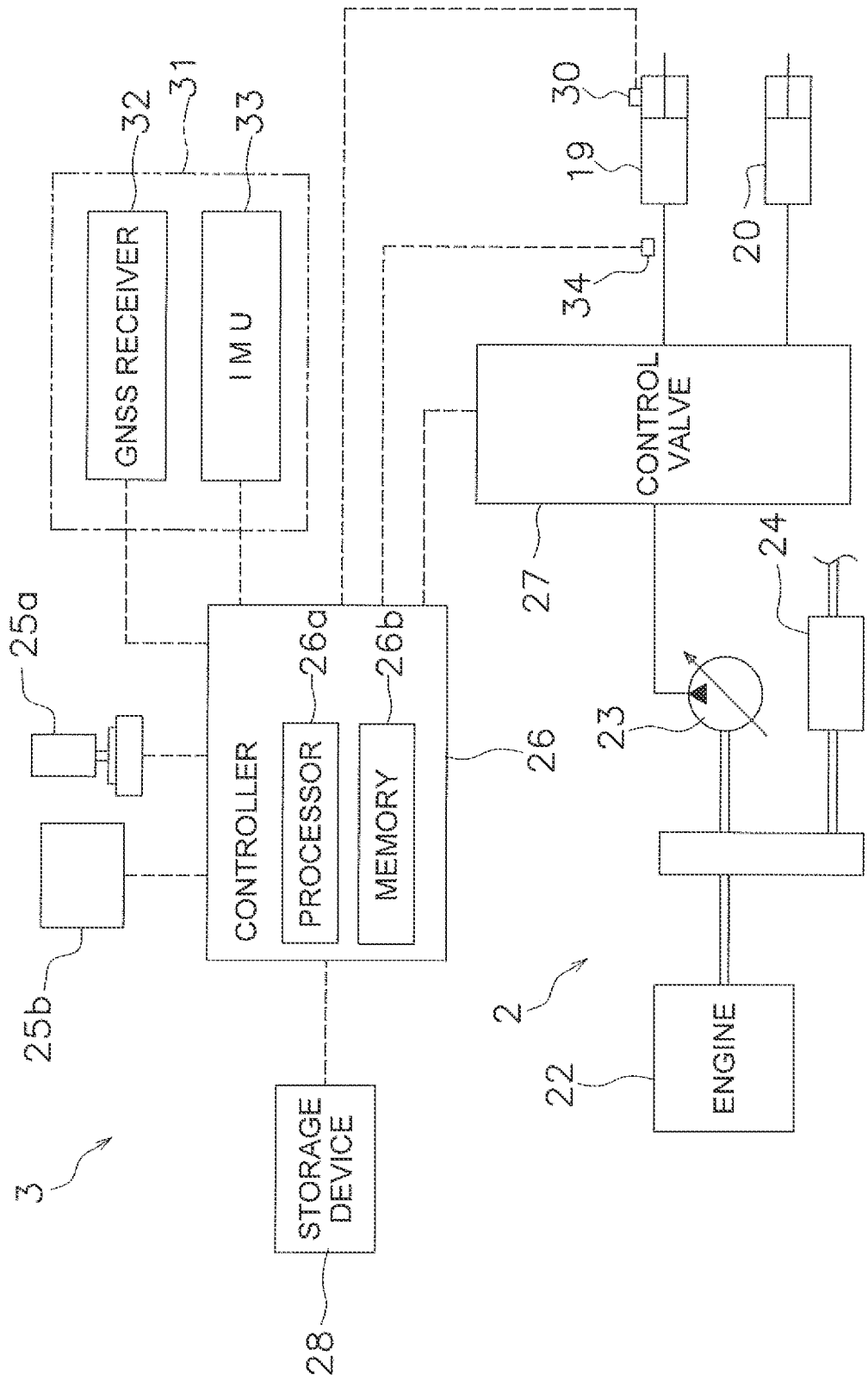
FIG. 2 is a block diagram illustrating configurations of a drive system and a control system of the work machine according to the present embodiment.

The work machine 1 includes a drive system 2 and a control system 3. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the tilt cylinder 20 and the lift cylinder 19. While only one hydraulic pump 23 is illustrated in FIG. 2, a plurality of hydraulic pumps may be provided.

The power transmission device 24 transmits the driving power of the engine 22 to the travel device 12. The power transmission device 24 may be, for example, a hydrostatic transmission (HST). The power transmission device 24 may be, for example, a torque converter or a transmission including a plurality of speed change gears.

(Control System)

The control system 3 is a system for controlling the work machine 1 including the work implement 13. As illustrated in FIG. 2, the control system 3 includes an operating device 25a, an input device 25b, a controller 26, a storage device 28, and a control valve 27. The control system 3 is further provided with a work implement sensor 30, a positional sensor 31, and a load sensor 34.

(Operating Device)

The operating device 25a is disposed in the operator's cab 14. The operating device 25a is a device for operating, for example, at least one of the travel device 12, the work implement 13, the engine 22, and the power transmission device 24.

The operating device 25a is operated by an operator. The operating device 25a includes, for example, an operating lever, a pedal, and a switch and the like.

The operating device 25a outputs an operation signal for operating the work implement 13 to the controller 26 according to an operation by the operator. In addition, the operating device 25a outputs an operation signal for operating the travel device 12 to the controller 26 according to an operation by the operator. In addition, the operating device 25a outputs an operation signal for operating the power transmission device 24 to the controller 26 according to an operation by the operator.

(Input Device)

The input device 25b is disposed in the operator's cab 14. The input device 25b is a device for performing automatic control settings of the work machine 1 as mentioned below.

The input device 25b is, for example, touch screen. The input device 25b is not limited to a touch screen and may include hardware keys or the like. The input device 25b outputs an input signal for automatically controlling the work machine 1 to the controller 26 according to a setting operation by the operator.

An example in which the setting of the automatic control of the work machine 1 is performed with the input device 25b is described in the present embodiment. The input device 25b may be configured to output signals for controlling the devices operated with the above operating device 25a. In this case, the input signals outputted from the input device 25b are interpreted as the above operation signals.

(Controller)

The controller 26 is used for controlling the work machine 1. For example, the controller 26 controls the work machine 1 to dig an actual topography. In addition, the controller 26 controls the work machine to dig a digging wall 53 formed between a plurality of slots. The controller 26 includes a processor 25a and a memory 26b.

The processor 26a includes at least one central processing unit (CPU). The present embodiment is explained by using an example in which the processor 26a is configured from one CPU.

In the present embodiment, while an example of the processor 26a being configured from one CPU is described, the processor 26a may be configured from a plurality of CPUs.

The processor 26a acquires operation signals from the operating device 25a. The processor 26a acquires input signals from the input device 25b. The processor 26a executes a control program for controlling the work machine 1.

The processor 26a controls the work machine 1 based on the control program. Specifically, the processor 26a controls the work machine 1 based on the control program and control data to be used when the control program is executed. The processor 26a reads the control data from the storage device 28. In addition, the processor 26a records the control data in the storage device 28. In the following explanation, the phrase "recording in the storage device 28" may be interpreted as "recording in the storage device 28 through the memory 26b."

For example, when the processor 26a acquires an operation signal and/or an input signal for the work machine, the processor 26a refers to the control data recorded in the storage device 28 and executes the control program. As a result, the processor 26a outputs a control signal for the work machine to at least one of the travel device 12, the engine 22, and the power transmission device 24 according to the operation signal for the work machine and/or the input signal for the work machine.

The at least one of the travel device 12, the engine 22, and the power transmission device 24 operates based on the control signal for the work machine. In this way, the work machine 1 travels due to the operation of the travel device 12, the engine 22, and the power transmission device 24.

Moreover, when the processor 26a acquires the operation signal and/or the input signal for the work implement, the processor 26a refers to the control data recorded in the storage device 28 and executes the control program. As a result, the processor 26a outputs a control signal for the work implement, which corresponds to the operation signal for the work implement, to the control valve 27. The control valve 27 operates based on the control signal for the work implement. The work implement 13 operates due to of the operation of the control valve 27.

The memory 26b is configured from a semiconductor memory or the like. Specifically the memory 26b may include a volatile memory such as a random access memory (RAM). The memory 26b may include a non-volatile memory such as a read-only memory (ROM). The memory 26b records the control data to be used in the execution of the control program. The control data includes generated data and the like which is generated during the execution of the control program.

(Storage Device)

The storage device 28 is an example of a non-transitory recording medium that can be read by the processor 26a.

The storage device 28 is configured, for example, from a semiconductor memory and/or a magnetic disc or the like. In addition, the storage device 28 includes, for example, a non-volatile such as a ROM. The storage device 28 may include a volatile memory such as a RAM. The storage device 28 may include, for example, an optical disk or the like.

The storage device 28 records the control program for controlling the work machine 1. The memory 26b records the control data to be used in the execution of the control program. The control data includes basic data or the like which is required for executing the control program.

(Control Valve)

The control valve 27 is used for controlling the work implement 13. The control valve 27 is, for example, a proportional control valve. The control valve 27 may also be a pressure proportional control valve. Moreover, the control valve 27 may be an electromagnetic proportional control valve.

The control valve 27 is disposed between the hydraulic pump 23 and hydraulic actuators such as the lift cylinder 19 and the tilt cylinder 20. The hydraulic fluid supplied from the hydraulic pump 23 is supplied to the lift cylinder 19 and/or the tilt cylinder 20 through the control valve 27. The control valve 27 controls the flow rate of the hydraulic fluid.

Specifically, the control valve 27 controls the flow rate of the hydraulic fluid based on a control signal for the work implement from the processor 26a. For example, the control valve 27 controls the flow rate of the hydraulic fluid so as to become an actuation rate at which the lift cylinder 19 and/or the tilt cylinder 20 extend and contract corresponding to the control signal for the work implement. As a result, the lift cylinder 19 and/or the tilt cylinder 20 extends or contracts and the blade 18 is disposed in the position corresponding to the operation signal for the work implement.

(Work Implement Sensor)

The work implement sensor 30 is a sensor for detecting the position of the work implement 13 with respect to the vehicle body 11. For example, the work implement sensor 30 is disposed on the work implement 13. The work implement sensor 30 generates work implement position data which indicates the position of the work implement 13 with respect to the vehicle body 11. The work implement position data is outputted to the processor 26a. The processor 26a recognizes the position of the work implement 13 based on the work implement position data. The processor 26a records the work implement position data in the storage device 28.

The work implement sensor 30 may be a displacement sensor that detects displacement of the work implement 13. In this case, the work implement sensor 30 generates displacement data of the work implement which indicates the displacement from a reference position of the work implement 13. The displacement data of the work implement is outputted to the processor 26a. The processor 26a calculates the work implement position data which indicates the position of the work implement 13 based on the displacement data of the work implement. The processor 26a recognizes the position of the work implement 13 based on the work implement position data.

(Positional Sensor)

The positional sensor 31 detects the position of the work machine 1 (vehicle body 11) and the attitude of the work machine 1 (vehicle body 11). The positional sensor 31 includes a GNSS receiver 32 and an IMU 33.

GNSS is an abbreviation of "global navigation satellite system." The global positioning system (GPS) is included in the GNSS. IMU is an abbreviation for "inertial measurement unit."

The GNSS receiver 32 is a receiver for the GNSS. The GNSS receiver 32 detects the position of the work machine 1 (vehicle body 11). For example, an antenna of the GNSS receiver 32 is disposed on the operator's cab 14. The antenna of the GNSS receiver 32 may be disposed in a position other than on the operator's cab 14.

The GNSS receiver 32 receives a positioning signal from a satellite. The GNSS receiver 32 computes the position of the antenna based on the positioning signal. As a result, the GNSS receiver 32 generates current position data which indicates the position of the work machine 1 (vehicle body 11). The GNSS receiver 32 outputs the current position data to the processor 26a. The processor 26a records the current position data in the storage device 28.

The processor 26a recognizes the current position of the work machine 1, the traveling direction of the work machine 1, and a vehicle speed based on the current position data.

The IMU 33 detects the attitude of the work machine 1. The IMU 33 is disposed inside the vehicle body 11. For example, the IMU 33 is configured from a triaxial gyroscope and a three-directional accelerometer and generates three-dimensional angular speed data and three-dimensional acceleration data. The IMU 33 outputs the angular speed data and the acceleration data to the processor 26a.

The processor 26a calculates vehicle body inclination angle data based on the angular speed data and the acceleration data. The processor 26a records the vehicle body inclination angle data in the storage device 28.

The vehicle body inclination angle data includes the pitch angle about a pitch axis that extends in the transverse direction of the work machine 1, the roll angle about a roll axis that extends in the front-back direction of the vehicle body 11, and the yaw angle about a yaw axis that extends in the up-down direction of the work machine 1.

The processor 26a calculates a blade tip position Pb of the blade 18 based on the current position data, the work implement position data, and the vehicle body inclination angle data.

For example, the processor 26a acquires global coordinate data and local coordinate data of the GNSS receiver 32 based on the current position data. The processor 26a calculates the local coordinate data of the blade tip position Pb with respect to the GNSS receiver 32 based on the work implement position data.

The processor 26a calculates the global coordinate data of the blade tip position Pb based on the local coordinate data of the GNSS receiver 32, the local coordinate data of the blade tip position Pb, and the vehicle body inclination angle data. The processor 26a recognizes the global coordinates of the blade tip position Pb as the current blade tip position Pb of the blade 18.

The processor 26a records the global coordinate data of the GNSS receiver 32, the local coordinate data of the GNSS receiver 32, the local coordinate data of the blade tip position Pb, and the global coordinate data of the blade tip position Pb, in the storage device 28.

(Load Sensor)

The load sensor 34 detects a load acting on the work implement 13. The load sensor 34 outputs load data corresponding to the load acting on the work implement 13 to the processor 26a. The processor 26a recognizes the load acting on the work implement 13 based on the load data. The processor 26a records the load data in the storage device 28.

The load sensor 34 is, for example, a pressure sensor for detecting the hydraulic pressure of the lift cylinder 19. In this case, the load data includes pressure data corresponding to the hydraulic pressure of the lift cylinder 19. The processor 26a recognizes the load acting on the work implement 13 based on the pressure data, and records the pressure data in the storage device 28.

The load sensor 34 may be a sensor for detecting a parameter other than the hydraulic pressure of the lift cylinder 19. For example, the load sensor 34 may be a sensor for detecting the tractive force of the work machine 1. Alternatively, the load sensor 34 may be a sensor for detecting the amount of slippage of the travel device 12.

Even when the above types of sensors are used as the load sensor 34, the processor 26a recognizes the load acting on the work implement 13 based on the above parameter such as tractive force data corresponding to the tractive force or slip data. The processor 26a records the above types of data in the storage device 28.

(Automatic Control of Work Machine)

The automatic control of the work machine 1 is executed by the processor 26a. For example, the automatic control of the work machine 1 may be a fully automatic control in which the work machine 1 is automatically controlled by the processor 26a, or a semi-automatic control executed based on the processor 26a and manual operations of the operator.

The processor 26a automatically controls the work machine 1 based on actual topography data, design topography data, and the current position data which indicates the current position of the work machine 1. The current position data is generated by the above positional sensor 31. For example, the current position data is generated by the GNSS receiver 32.

(Actual Topography Data)

Figure 3:
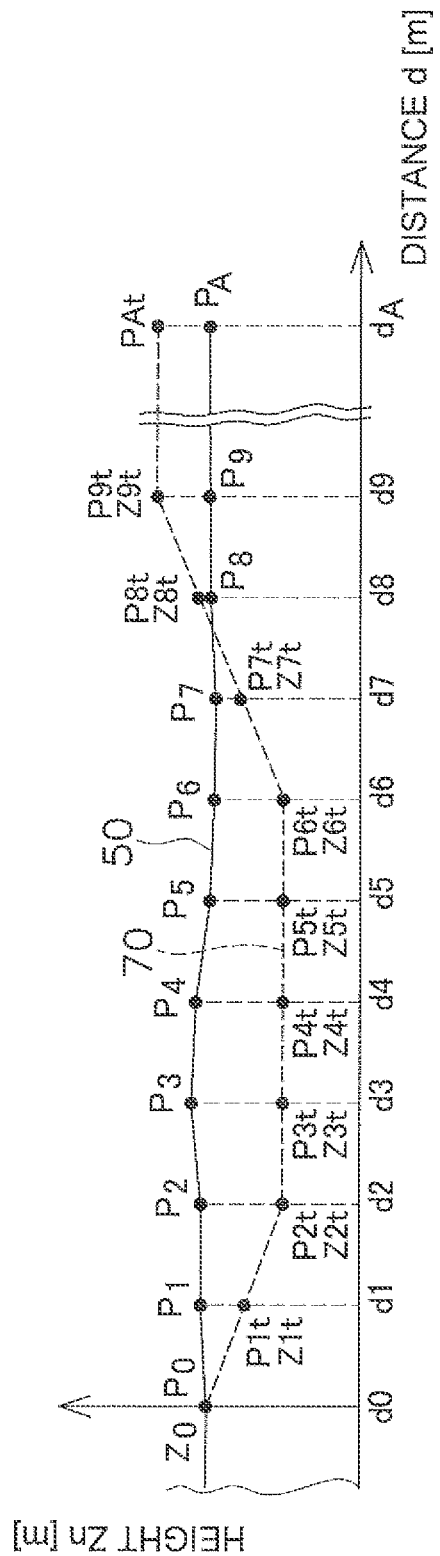
FIG. 3 is a cross-sectional view illustrating an example of an actual topography as seen from the vehicle width direction in the present embodiment.

FIG. 3 illustrates a cross-section of an actual topography 50. In FIG. 3, a vertical axis indicates a height of the topography and a horizontal axis indicates a distance when the work machine 1 travels forward in the traveling direction using a starting position PO as a reference.

For example, the actual topography data is data which indicates the actual topography 50 of a work site as illustrated in FIG. 3. Specifically, the actual topography data is data which indicates the current topography 50 of the work site located in the traveling direction of the work machine 1.

The actual topography data includes a plurality of reference point data Pn (n=1, 2, . . . , A) on a forward travel path of the work machine 1, and height data Zn of the actual topography 50 at each reference point data Pn.

The plurality of the reference point data Pn is position data which is set at predetermined intervals D in the traveling direction of the work machine 1. For example, the predetermined interval D is defined as "D=d(n+1)−d(n), where n is a positive number." The predetermined interval D can be set arbitrarily. While an example in which the predetermined interval D is 1 m is illustrated here, the predetermined interval D may be less than 1 m or greater than 1 m.

The actual topography data is recorded in the storage device 28. For example, the topography data is generated by a survey or the like. The topography data may be recorded in an external device and thereafter the topography data may be recorded in the storage device 28 from the external device.

The actual topography data may be generated by the processor 26a by surveying distance of the actual topography 50 with an on-board laser imaging detection and ranging device (LIDAR) or the like. In this case, the actual topography data may be generated by the processor 26a based on survey data generated by the LIDAR and recorded in the storage device 28.

In addition, the topography data may be generated based on the coordinate data of a portion of the work machine 1. For example, locus data of the crawler belts 16 may be generated by the processor 26a based on the coordinate data of the crawler belts 16. The locus data of the crawler belts 16 is recorded in the storage device 28 as the actual topography data. Here, the coordinate data of the crawler belts 16 is calculated based on the current position data.

(Design Topography Data)

FIG. 3 illustrates a cross-section of a target design topography 70 and a cross-section of the actual topography 50. The design topography data is data which indicates the target design topography 70 of the work site illustrated in FIG. 3. Specifically, the design topography data is data which indicates the target design topography 70 that is the target of the digging work by the work implement 13. The design topography data may be interpreted as data which indicates a target locus of the blade tip position Pb of the blade 18.

The design topography data includes the plurality of the reference point data Pn and the height data Zn of the target design topography 70 at each of the reference point data Pn in the same way as the actual topography data. The design topography data is recorded in the storage device 28.

For example, the design topography data is generated by reading the data (Pnt, Znt), which indicates the target design topography 70, from the storage device 28. The data (Pnt, Znt) which indicates the target design topography 70 is recorded in advance in the storage device 28. The data which indicates the target design topography 70 may be recorded in an external device and thereafter the data which indicates the target design topography 70 may be recorded in the storage device 28 from the external device.

In addition, the design topography data may be generated based on the actual topography data. In this case, the design topography data is generated by subtracting or adding predetermined depth data from the height data of the actual topography 50 at each of reference point data Pn in the actual topography data. The generated design topography data is recorded in the storage device 28 as the data (Pnt, Znt) which indicates the target design topography 70. The predetermined depth data is recorded in advance in the storage device 28.

When the work machine 1 works based on the design topography data, the actual topography data after the digging is updated. The updated actual topography data is used as the most recent actual topography data. In this case, the most recent actual topography data is generated in the same way as the above actual topography data.

For example, the actual topography data after the digging may be generated by the processor 26a based on the coordinate data of the crawler belts 16. Moreover, the actual topography data after the digging may be generated by the processor 26a based on the coordinate data of the blade tip position Pb. Moreover, the actual topography data after the digging may be generated based on the survey data generated by the LIDAR. The above actual topography data after the digging may be generated by surveying or the like as needed.

(Digging Mode)

Figure 4:
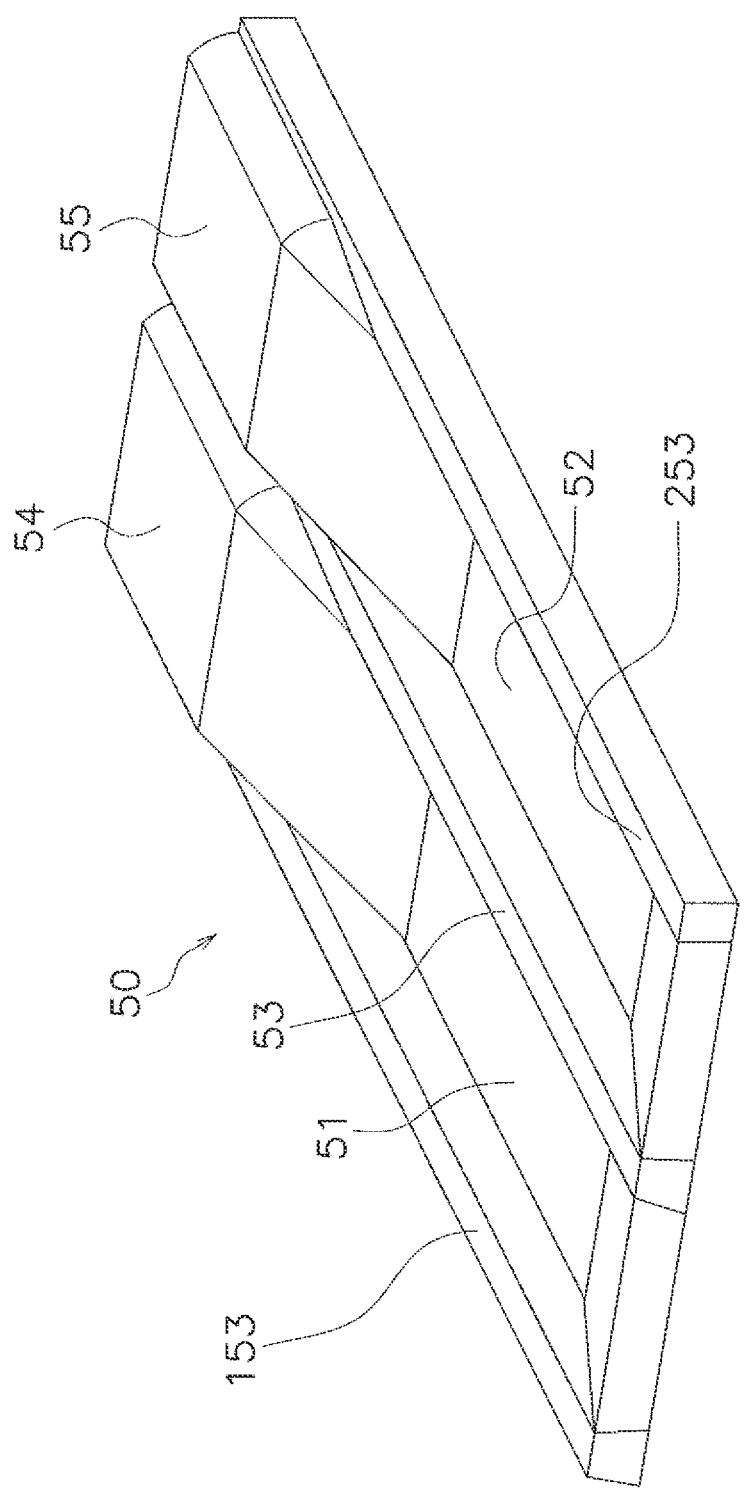
FIG. 4 is a perspective view illustrating an example of the actual topography in which slots and digging walls are formed in the present embodiment.

The processor 26a selectively executes a slot digging mode and a wall digging mode. The slot digging mode is a control mode for digging the actual topography 50 as illustrated in FIG. 4. Slots 51 and 52 (examples of adjacent slots) are formed in the actual topography 50 with the slot digging mode.

The wall digging mode is a control mode for digging a digging wall 53 formed between the plurality of slots 51 and 52. The controller 26a may also execute the other control mode which is different from the slot digging mode and the wall digging mode.

(Slot Digging Mode)

Figure 6:
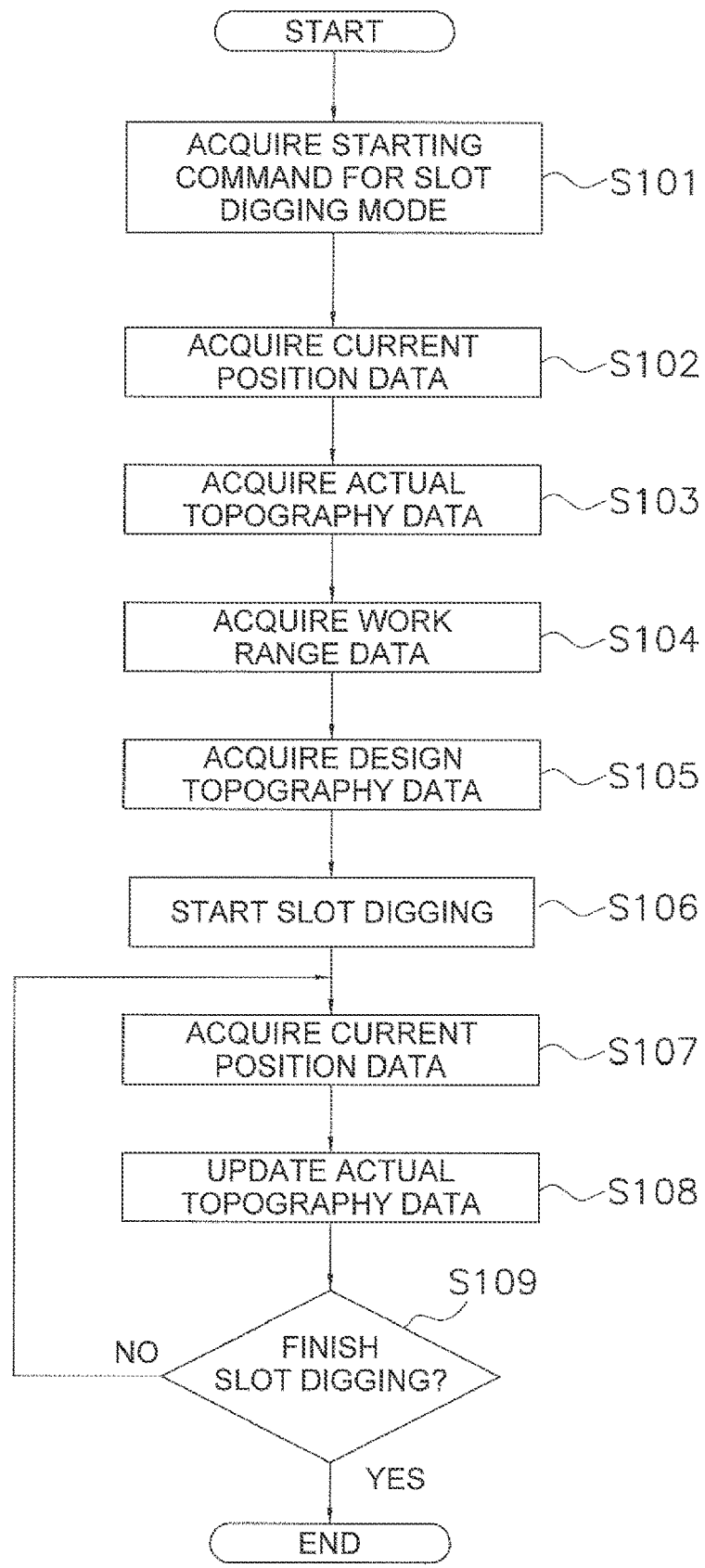
FIG. 6 is a flow chart illustrating processing of automatic control during the slot digging mode of the present embodiment.

FIG. 6 is a flow chart which illustrates processing of an automatic control during the slot digging mode. As illustrated in FIG. 6, in step S101, the processor 26a acquires a starting command for the slot digging mode and starts the slot digging mode.

The start of the slot digging mode is executed as described below. For example, when the operator operates the input device 25b, the processor 26a recognizes the input signal from the input device 25b as the starting command for the slot digging mode. The processor 26a starts the slot digging mode based on the input signal.

In addition, the processor 26a may start the slot digging mode based on construction plan data which indicates a construction plan. In this case, the processor 26a, for example, refers to the construction plan data recorded in the storage device 28 and recognizes dig-starting data for the slots, which is included in the construction plan data, as the starting command of the slot digging mode. The processor 26a starts the slot digging mode based on the dig-starting data for the slots. The construction plan data is recorded in advance in the storage device 28.

In addition, the processor 26a, for example, may start the slot digging mode based on conditional data for the slots which indicates a condition for starting the slot digging mode. In this case, for example, the processor 26a determines whether a parameter such as the actual topography data satisfies the conditional data for the slots, and the processor 26a starts the slot digging mode when the parameter satisfies the conditional data for the slots. The conditional data for the slots is recorded in advance in the storage device 28.

In step S102, the processor 26a acquires the above current position data. As a result, the processor 26a recognizes the position of the vehicle body 11 of the work machine 1. The processor 26a continuously acquires and updates the current position data during the execution of the following processes.

In step S103, the processor 26a acquires the above actual topography data. As a result, the processor 26a recognizes the actual topography 50.

In step S104, the processor 26a acquires work range data which indicates a work range over which the work machine 1 works on the actual topography 50. For example, the processor 26a acquires the work range data based on an input signal from the input device 25b.

Specifically, the processor 26a acquires the work range data when the operator operates the input device 25b for acquiring the work range. In addition, after the work machine 1 has dug the actual topography 50, the processor 26a may acquire the work range data by an operation of the operator, generate the work range data based on the actual topography data, and acquire the work range data.

The processor 26a may acquire the work range data by the other method. For example, the processor 26a may acquire the work range data from an external device.

Figure 5:
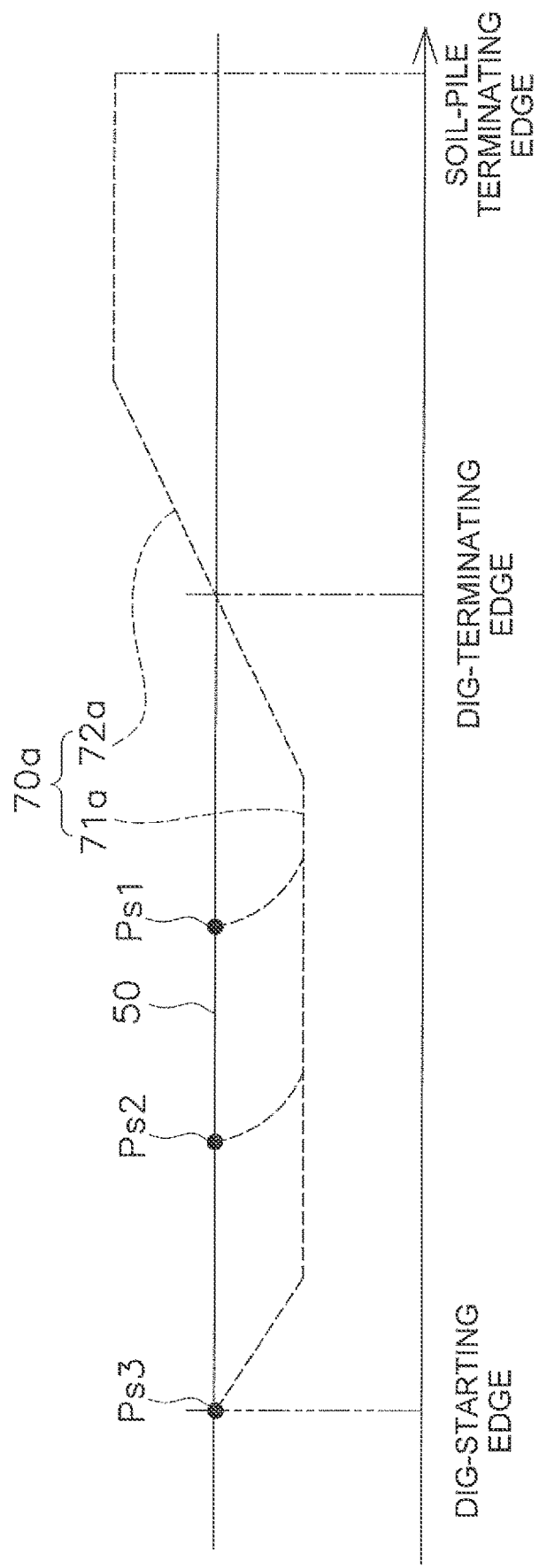
FIG. 5 is a cross-sectional view illustrating examples of the actual topography and a target design topography as seen from the vehicle width direction during a slot digging mode of the present embodiment.

FIG. 5 illustrates an example of the actual topography 50 in the slot digging mode and an example of the work range inside the actual topography 50.

The work range data includes dig-starting edge position data which indicates the starting edge position of the dig, and dig-terminating edge position data which indicates the terminating edge of the dig. The work range data further includes soil-pile terminating edge position data which indicates the terminating edge position of soil-pile. The soil-pile is work for discharging the soil, which is held by the blade 18 after the digging is finished, onto the actual topography 50.

The dig-starting edge position data and the dig-terminating edge position data may be set by inputting the dig-starting edge position and the dig-terminating edge position with the input device 25b.

Alternatively, the dig-starting edge position data may be set by inputting the starting edge position of the execution with the input device 25b, and the dig-terminating edge position data may be set by inputting the distance from the starting edge position of the execution to the terminating edge position of the dig with the input device 25b. In this case, the dig-terminating edge position data is calculated by the processor 26a based on the dig-starting edge position data and the distance data.

Alternatively, the dig-terminating edge position data may be set by inputting the terminating edge position of the execution with the input device 25b, and the dig-starting edge position data may be set by inputting the distance from the terminating edge position of the digging to the starting edge position of the digging with the input device 25b. In this case, the dig-starting edge position data is calculated by the processor 26a based on the dig-terminating edge position data and the distance data.

The soil-pile terminating edge position data may also be set by inputting the terminating edge position of the soil-pile with the input device 25b. Alternatively, the soil-pile terminating edge position data may be set by inputting the length of the soil-pile range with the input device 25b. In this case, the soil-pile terminating edge position data is calculated by the processor 26a based on the dig-terminating edge position data and length data which indicates the length of the soil-pile range.

The dig-starting edge position data, the dig-terminating edge position data, and the soil-pile terminating edge position data are recorded in the storage device 28 and acquired by the processor 26a. The work range data may be used for not only making the processor 26a recognize the work range of the work machine 1, but also indicating the traveling direction to the work machine 1 by the processor 26a. In this case, the processor 26a indicates the traveling direction to the work machine 1 based on the work range data, for example, the dig-starting edge position data and the dig-terminating edge position data.

In step S105, the processor 26a acquires the above design topography data. As a result, the processor 26a recognizes a target design topography 70a, for example, as illustrated in FIG. 5, based on the design topography data.

The target design topography 70a includes a first target topography 71a and a second target topography 72a. At least a portion of the first target topography 71a is located lower than the actual topography 50. At least a portion of the second target topography 72a is located higher than the actual topography 50. The first target topography 71a and the second target topography 72a are set based on the design topography data recorded in the storage device 28 in advance as described above.

The first target topography 71a and the second target topography 72a may be set based on the actual topography 50. In this case, for example, the first target topography 71a may be set so as to be located lower than the actual topography 50 at a predetermined distance. In addition, the first target topography 71a may be set so as to be inclined at a predetermined angle with respect to the actual topography 50 or to the horizontal direction.

For example, the second target topography 72a may be set to be located higher than the actual topography 50 by a predetermined distance. In addition, the second target topography 72a may be set to be located lower than the actual topography 50 in the case of removing the soil by dropping the soil down a precipice. In addition, the second target topography 72a may be set to be inclined by a predetermined angle with respect to the actual topography 50 or to the horizontal direction.

In step S106, the processor 26a instructs the work machine 1 to start the slot digging. As a result, the work machine 1 starts the slot digging.

The processor 26a controls the work machine 1 to follow the target design topography 70a based on the design topography data.

For example, the processor 26a controls the work machine 1 so that the work machine 1 travels forward from the dig-starting edge position toward the dig-terminating edge position based on the work range data (the dig-starting edge position data and the dig-terminating edge position data). The processor 26a controls the work implement 13 so that the blade tip position Pb of the blade 18 moves along the first target topography 71a based on the design topography data. As a result, the actual topography 50 is dug and the slots 51 and 52 are formed in the actual topography 50 as illustrated in FIG. 4.

In addition, the processor 26a controls the work machine 1 so that the work machine 1 travels forward from the dig-terminating edge position toward the soil-pile terminating edge position based on the work range data (soil-pile terminating edge position data). The processor 26a controls the work implement 13 so that the blade tip position Pb of the blade 18 moves along the second target topography 72a. As a result, the soil, which is held by the blade 18 after the digging is finished, is placed on the actual topography 50. Soil piles 54 and 55 are formed on the actual topography 50 as illustrated in FIG. 4.

A plurality of dig-starting positions Ps1 to Ps3 may be set between the dig-starting edge position and the dig-terminating edge position as illustrated in FIG. 5. In this case, the processor 26a controls the work machine 1 so that the work machine 1 starts the dig from the dig-starting position Ps1 close to the dig-terminating edge position. Thereafter, the processor 26a controls the work machine 1 so that the work machine 1 starts the digging in order of the dig-starting positions Ps2 and Ps3.

Specifically, the processor 26a first controls the work machine 1 so that the work machine 1 performs the digging from the first dig-starting position Ps1 toward the dig-terminating edge position, and performs the soil-pile from the dig-terminating edge position to the soil-pile terminating edge position.

The processor 26a then controls the work machine 1 so that the work machine 1 travels in reverse to the second dig-starting position Ps2 and performs the digging from the second dig-starting position Ps2 toward the dig-terminating edge position, and performs the soil-pile from the dig-terminating edge position to the soil-pile terminating edge position.

The processor 26a finally controls the work machine 1 so that the work machine 1 travels in reverse to the third dig-starting position Ps3 and performs the digging from the third dig-starting position Ps3 toward the dig-terminating edge position, and performs the soil-pile from the dig-terminating edge position to the soil-pile terminating edge position.

In this way, the work machine 1 can automatically dig the slots 51 and 52, even if the processor 26a sets a plurality of dig-starting positions Ps1 to Ps3.

In step S107, the processor 26a acquires the current position data. As a result, the processor 26a recognizes the position of the vehicle body 11 of the work machine 1. In step S108, the processor 26a updates the actual topography data. The updating intervals of the actual topography data may be performed at a predetermined cycle or may be performed in real time.

For example, the processor 26a updates the most recent locus data of the crawler belts 16 or the most recent locus data of the blade tip position Pb of the blade 18 as the most recent actual topography data. The survey data generated by a device such as the LIDAR may be used as the most recent actual topography data.

Alternatively, survey data measured by a surveying device outside of the work machine 1 may be used as the most recent actual topography data. For example, aerial laser surveying may be used as the external surveying device. In addition, the most recent actual topography data may be generated from image data of the actual topography 50 which is captured by a camera. For example, the most recent actual topography data may be generated from aerial survey data of an unmanned aerial vehicle (UAV).

In step S109, the processor 26a determines whether to finish the slot digging. The processor 26a may determine to finish the slot digging according to an operation of the input device 25b. In addition, the processor 26a may determine to finish the slot digging based on the above construction plan data. In addition, the processor 26a may determine to finish the slot digging when a predetermined finish condition is satisfied.

The first slot 51 and the second slot 52 are formed when the processor 26a finishes the slot digging. In other word, one unit of control (the processes from step S101 to step S109) of the work machine 1 is finished.

For example, when the first slot 51 is formed, the processor 26*a* causes the work machine 1 to travel in reverse along the first slot 51 and then move to the side of the first slot 51. Thereafter, the processor 26*a* causes the work machine 1 to start the digging of the second slot 52. In this case, the processor 26*a* executes the above processes from step S101 to step S109 again. As a result, the second slot 52 is formed.

When the first slot 51 and the second slot 52 are formed, the digging wall 53 is formed between the first slot 51 and the second slot 52 as illustrated in FIG. 4. The digging wall 53 is a berm of soil which is remained along the first slot 51 and the second slot 52.

The processor 26*a* may form a plurality of first slots 51 by causing the work machine 1 to repeatedly execute a plurality of work units and thereafter start the digging of the second slot 52.

(Wall Digging Mode)

As explained above, when the formation of the first slot 51 is finished and the formation of the second slot 52 is started, the processor 26*a* causes the work machine 1 to move to the side such that the movement amount toward the side by the work machine 1 is greater than the width of the blade 18.

When the first slot 51 and the second slot 52 are formed, the digging wall 53 is formed between the first slot 51 and the second slot 52 as illustrated in FIG. 4. As explained above, the digging wall 53 is a berm of soil which is remained between the first and second lots 51 and 52 during the formation of the first and second lots 51 and 52.

Figure 7:
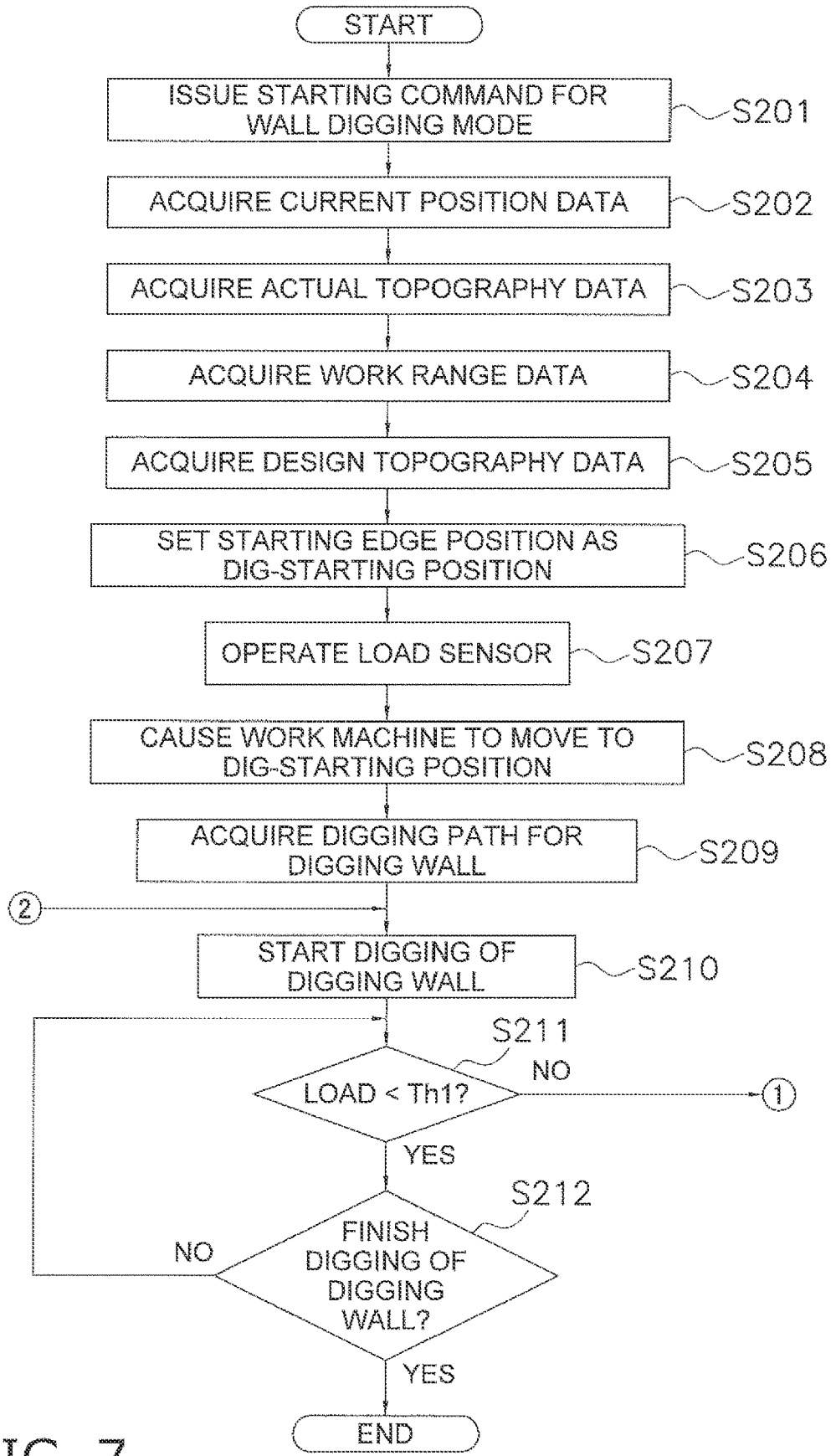
FIG. 7 is a flow chart illustrating processing of automatic control during a wall digging mode of the present embodiment.

FIG. 7 is a flow chart illustrating processing of automatic control during the wall digging mode. In step S201, the processor 26*a* instructs the work machine 1 to start the wall digging. As a result, the work machine 1 starts the digging of the digging wall 53.

The start of the wall digging mode is executed as follows. For example, when the operator operates the input device 25*b*, the processor 26*a* recognizes the input signal from the input device 25*b* as the starting command for the wall digging mode. The processor 26*a* starts the wall digging mode based on the input signal.

In addition, the processor 26*a* may start the wall digging mode based on construction plan data which indicates a construction plan. In this case, the processor 26*a*, for example, refers to the construction plan data recorded in the storage device 28 and recognizes dig-starting data for the digging wall, which is included in the construction plan data, as the starting command of the wall digging mode. The processor 26*a* starts the wall digging mode based on the dig-starting data for the digging wall. The construction plan data is recorded in advance in the storage device 28.

In addition, the processor 26*a*, for example, may start the wall digging mode based on conditional data for the digging wall which indicates a condition for starting the wall digging mode. In this case, the processor 26*a* determines whether a parameter such as the actual topography data satisfies the conditional data for the digging wall, and the processor 26*a* starts the wall digging mode when the parameter satisfies the conditional data for the digging wall. The conditional data for the digging wall is recorded in advance in the storage device 28.

In step S202, the processor 26*a* acquires the current position data in the same way as in step S102. The processor 26*a* continuously acquires and updates the current position data during the execution of the following processes. As a result, the processor 26*a* recognizes the position of the vehicle body 11 of the work machine 1. In step S203, the processor 26*a* acquires the above actual topography data. As a result, the processor 26*a* recognizes the actual topography 50.

The actual topography data further includes first slot position data which indicates the position of the first slot 51, second slot position data which indicates the position of the second slot 52, and digging wall position data which indicates the position of the digging wall 53.

In step S204, the processor 26*a* acquires the work range data of the digging wall 53. The work range data of the digging wall 53 includes dig-starting edge position data which indicates the starting edge position of the digging wall 53, and dig-terminating edge position data which indicates the terminating edge position of the digging wall 53. The work range data of the digging wall 53 further includes soil-pile terminating edge position data which indicates the terminating edge position of soil-pile when digging the digging wall 53.

Figure 8:
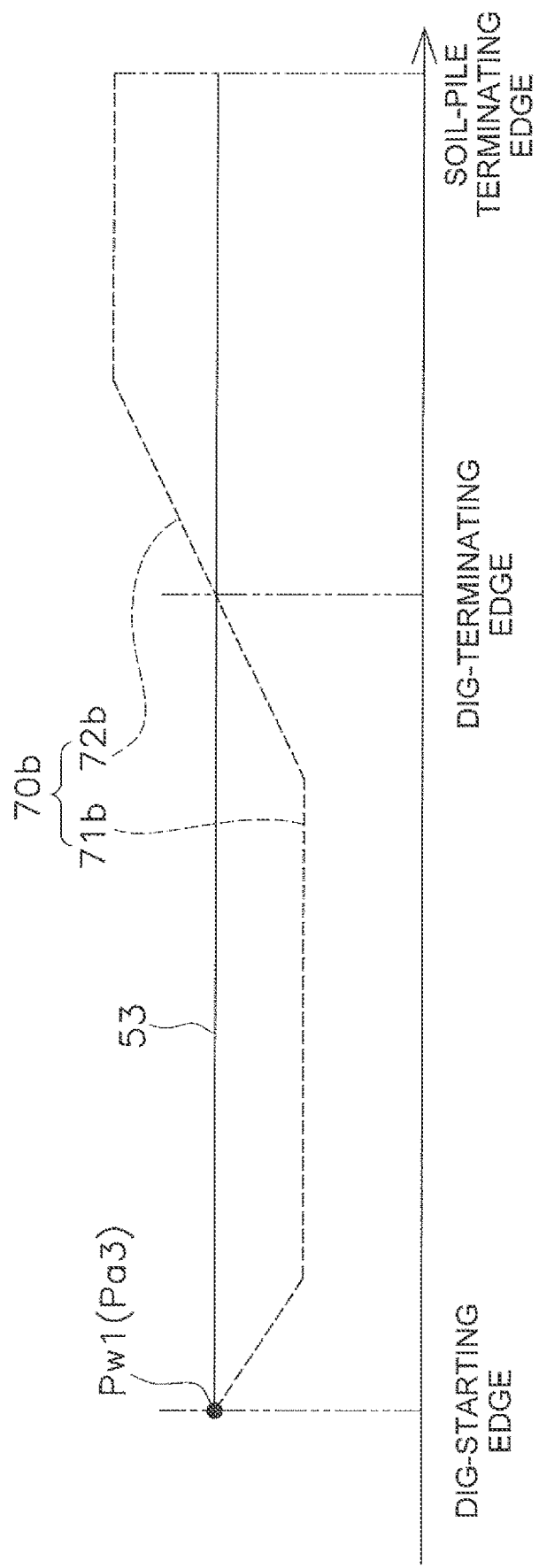
FIG. 8 is a cross-sectional view illustrating examples of the actual topography and the target design topography as seen from the vehicle width direction during the wall digging mode of the present embodiment.
Figure 9:
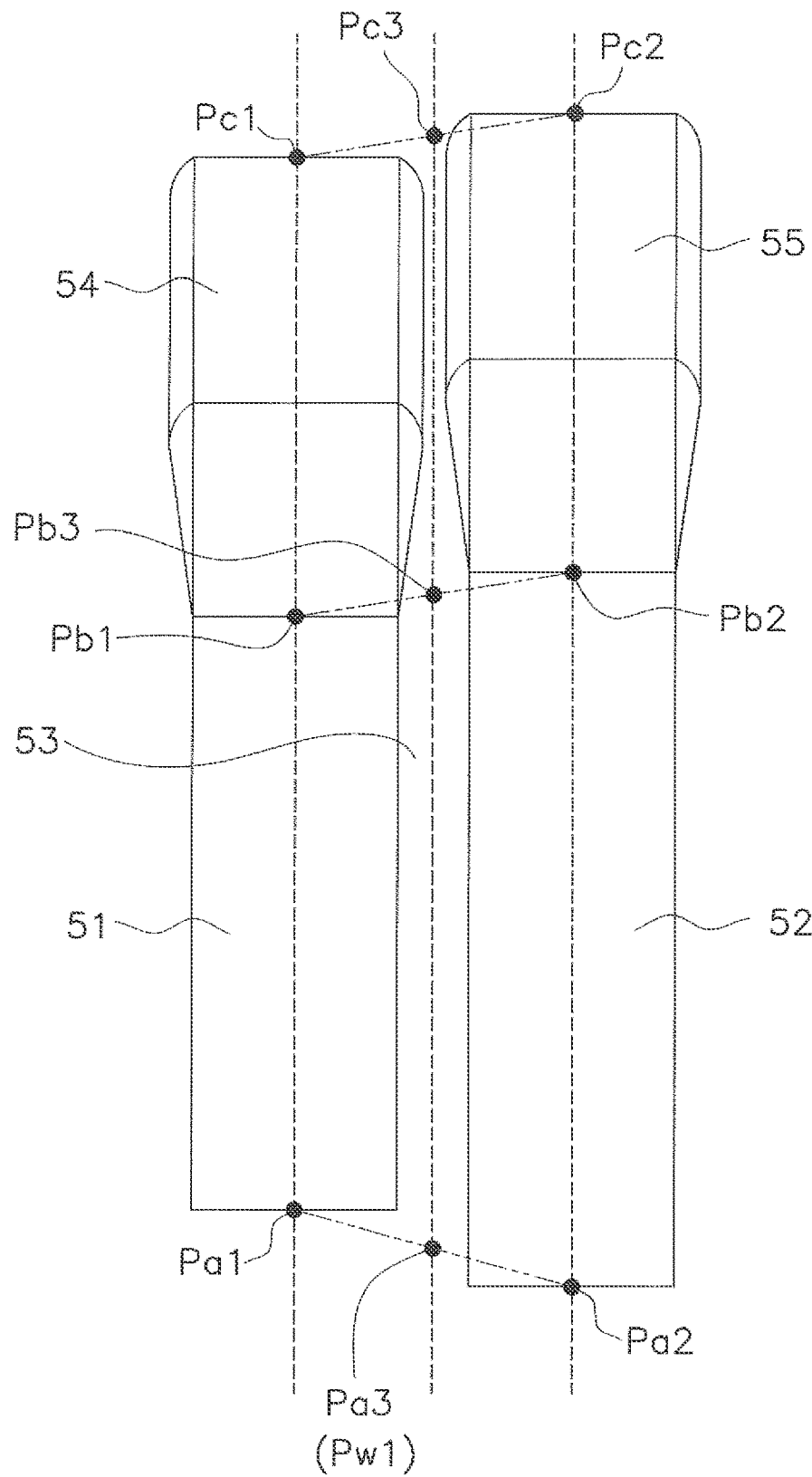
FIG. 9 illustrates a determination method for determining a work range in the wall digging mode of the present embodiment.
Figure 10:
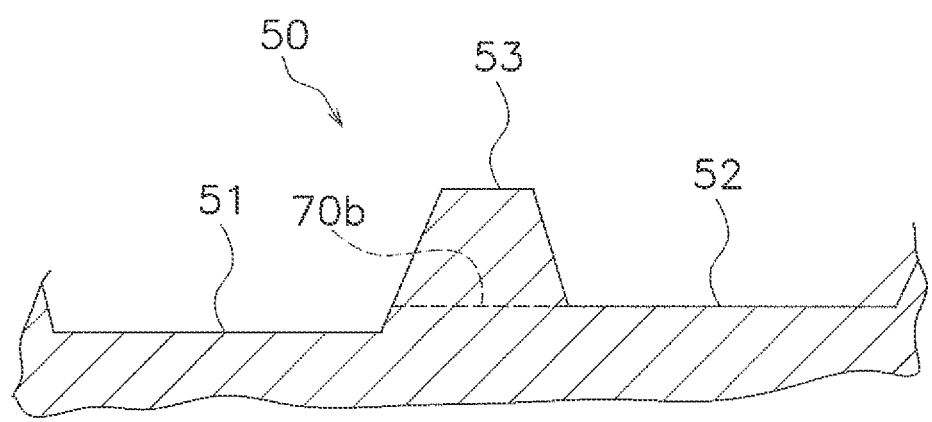
FIG. 10 is a cross-sectional view illustrating an example of the actual topography as seen from the traveling direction of the work machine in the present embodiment.

FIG. 8 illustrates an example of the digging wall 53 which is included in the actual topography 50 when viewing the actual topography 50 from the vehicle width direction. FIG. 9 illustrates the actual topography 50 when viewing the actual topography 50 from above. FIG. 10 is a cross-sectional view of the actual topography 50 when viewing the actual topography 50 in the traveling direction of the work machine 1.

As illustrated in FIG. 9, the processor 26*a* recognizes a dig-starting edge position Pa1 of the first slot 51 and a dig-starting edge position Pa2 of the second slot 52 based on the dig-starting edge position data of the first slot 51 and the dig-starting edge position data of the second slot 52. The processor 26*a* sets a dig-starting edge position Pa3 of the digging wall 53 based on the dig-starting edge position Pa1 of the first slot 51 and the dig-starting edge position Pa2 of the second slot 52.

Specifically, as illustrated in FIG. 9, the starting edge position Pa1 of the first slot 51 is defined by the midpoint in the width direction of the first slot 51. The starting edge position Pa2 of the second slot 52 is defined by the midpoint in the width direction of the second slot 52.

The processor 26*a* calculates an intermediate position between the starting edge position Pa1 of the first slot 51 and the starting edge position Pa2 of the second slot 52. The processor 26*a* sets the intermediate position as the starting edge position Pa3 of the digging wall 53.

As illustrated in FIG. 9, the starting edge position Pa3 of the digging wall 53 is the midpoint of a straight line that connects the dig-starting edge position Pa1 of the first slot 51 and the dig-starting edge position Pa2 of the second slot 52 as seen in a plan view. The dig-starting edge position data corresponding to the starting edge position Pa3 of the digging wall 53 is recorded in the storage device 28.

The starting edge position Pa3 of the digging wall 53 may be a position different from the intermediate position as long as the position is between the starting edge position Pa1 of the first slot 51 and the starting edge position Pa2 of the second slot 52. Moreover, the starting edge position Pa3 of the digging wall 53 may be set by the operator operating the input device 25*b*.

In addition, the processor 26*a* recognizes a dig-terminating edge position Pb1 of the first slot 51 and a dig-terminating edge position Pb2 of the second slot 52 based on the dig-terminating edge position data of the first slot 51 and the dig-terminating edge position data of the second slot 52. The processor 26*a* sets a dig-terminating edge position Pb3 of the digging wall 53 based on the dig-terminating edge position Pb1 of the first slot 51 and the dig-terminating edge position Pb2 of the second slot 52.

The terminating edge position Pb1 of the first slot 51 and the terminating edge position Pb2 of the second slot 52 are set in the same way as the starting edge position Pa1 of the first slot 51 and the starting edge position Pa2 of the second slot 52. In addition, the dig-terminating edge position Pb3 and a soil-pile terminating edge position Pc3 of the digging wall 53 are set based on the terminating edge positions Pb1 and Pb2 of the first and second slots 51 and 52 and the terminating edge positions Pc1 and Pc2 of the soil-pile in the same way as the starting edge position Pa3 of the digging wall 53. Moreover, the terminating edge position Pb3 and/or the soil-pile terminating edge position Pc3 of the digging wall 53 may be set by the operator operating the input device 25b. The set dig-terminating edge position Pb3 and the set soil-pile terminating edge position Pc3 of the digging wall 53 are recognized by the processor 26a and recorded in the storage device 28.

In step S205, the processor 26a sets the design topography data for the digging wall. As a result, the processor 26a recognizes the target design topography 70b, for example, as illustrated in FIG. 8, based on the design topography data for the digging wall.

As illustrated in FIG. 8, the target design topography 70b includes a first target topography 71b and a second target topography 72b. At least a portion of the first target topography 71b is located lower than the digging wall 53. At least a portion of the second target topography 72b is located higher than the digging wall 53. In addition, the second target topography 72b may be set to be located lower than the digging wall 53 in the case of removing the soil by dropping the soil down a precipice.

The first target topography 71b and the second target topography 72b are set based on the actual topography data which indicates the actual topography 50. For example, the processor 26a sets third height data which indicates the digging height of the digging wall 53 based on first height data which indicates the height of the first slot 51 and second height data which indicates the height of the second slot 52. The processor 26a recognizes the digging height of the digging wall as the target design topography 70b based on the third height data.

The processor 26a compares the height of the first slot 51 and the height of the second slot 52 based on the first height data and the second height data. The processor 26a sets the greatest height data among the first slot 51 and the second slot 52 as the third height data which indicates the digging height of the digging wall. In FIG. 10, the height of the second slot 52 is the greatest height between the first slot 51 and the second slot 52. In this way, the digging height for the digging wall is set by the processor 26a as the target design topography 70.

In step S206, the processor 26a sets the dig-starting edge position Pa3 of the digging wall 53 as a dig-starting position Pw1 as illustrated in FIGS. 8 and 9. The processor 26a also records the dig-starting edge position Pa3 of the digging wall 53 in the storage device 28 as the dig-starting position Pw1.

The dig-starting position Pw1 is not limited to the dig-starting edge position Pa3 of the digging wall 53, and the processor 26a may set the other position, which is set with reference to the starting edge position Pa3, as the dig-starting position Pw1. For example, the processor 26a may set a position spaced away by a predetermined distance from the dig-starting edge position Pa3 of the digging wall 53, as the dig-starting position Pw1.

In step S207, the processor 26a causes the load sensor to operate. For example, the processor 26a instructs the load sensor 34 to start the load detection. The load sensor 34 starts to detect the load acting on the work implement 13.

In step S208, the processor 26a causes the work machine 1 to move to the dig-starting position Pw1. For example, the processor 26a causes the work machine 1 to move to the dig-starting position Pw1 by sending a control signal to the drive system 2. The processor 26a may cause the work machine 1 to travel in reverse along the second slot 52 and then move to the dig-starting position Pw1 of the digging wall 53 as indicated by the arrow A1 n FIG. 11.

In step S209, the processor 26a acquires digging path data (example of first path information) for the digging wall. The digging path data for the digging wall indicates a digging path W1 (see FIG. 11) for the digging wall for digging the digging wall.

The processor 26a sets the digging path data for the digging wall based on the actual topography data of the first and second slots 51 and 52 (examples of adjacent slot) adjacent to the digging wall 53. The actual topography data used in this situation is an example of slot information.

For example, a digging path W1 for the digging wall is defined by the dig-starting position Pw1 (Pa3) of the digging wall 53, the dig-terminating edge position Pb3 of the digging wall 53, and the soil-pile terminating edge position Pc3 of the digging wall 53. The data corresponding to the positions Pw1 (Pa3), Pb3, and Pc3 are recorded in the storage device 28 as the digging path data for the digging wall.

Specifically, the digging path W1 for the digging wall includes a path from the dig-starting position Pw1 (Pa3) of the digging wall 53 toward the dig-terminating edge position Pb3 of the digging wall 53. In addition, the digging path W1 for the digging wall further includes a path from the dig-terminating edge position Pb3 of the digging wall 53 toward the soil-pile terminating edge position Pc3 of the digging wall 53.

In step S210, the processor 26a instructs the work machine 1 to perform the digging start of the wall digging for starting the digging of the digging wall. As a result, the work machine 1 starts to dig the digging wall.

When the work machine 1 starts to dig the digging wall, the processor 26a controls the work machine based on the digging path data for the digging wall. The processor 26a also controls the work machine to follow the target design topography 70b of the digging wall 53 based on the design topography data for the digging wall.

Figure 11:
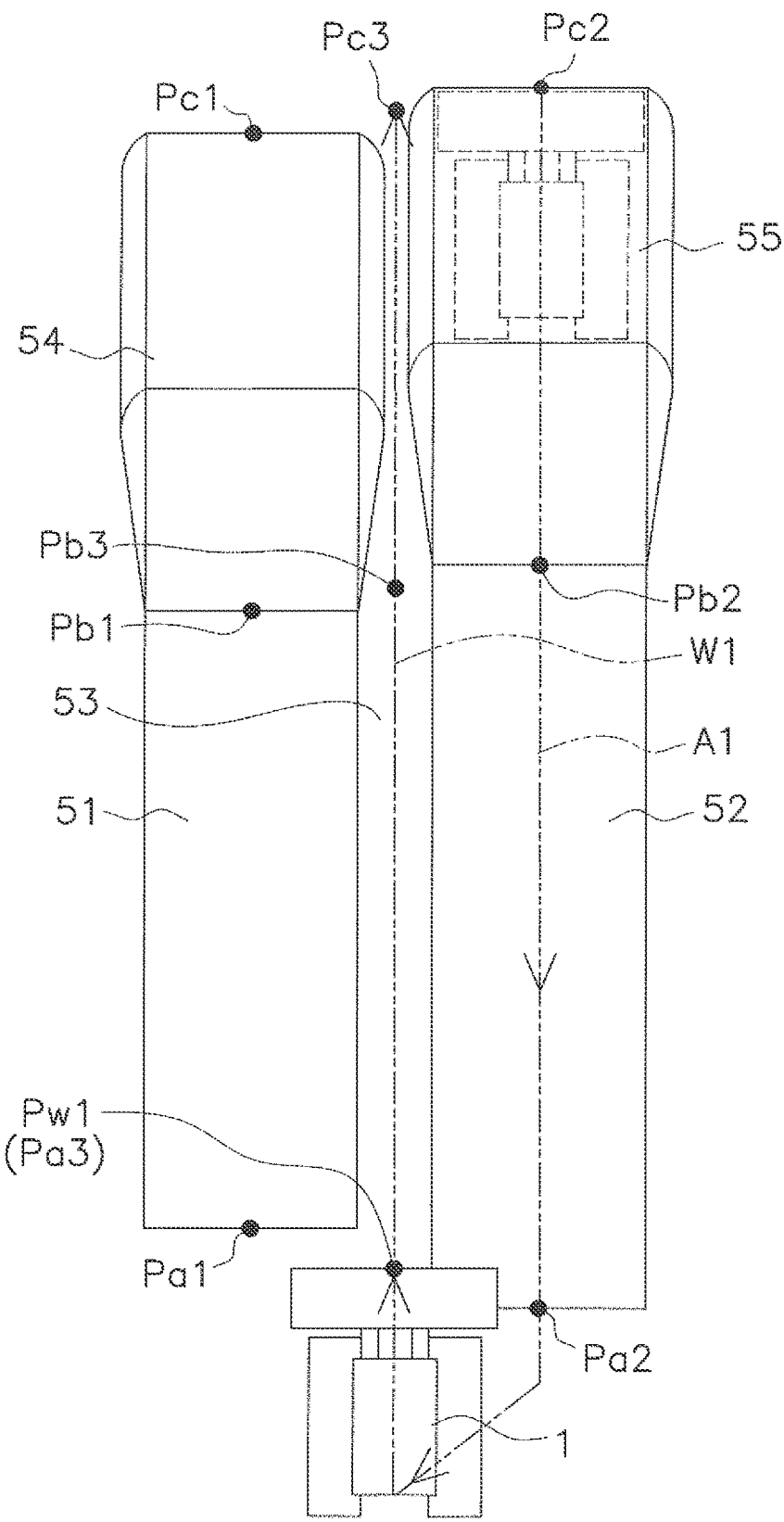
FIG. 11 illustrates operations of the work machine during the wall digging mode of the present embodiment.

For example, the processor 26a controls the work machine 1 so that the work machine 1 travels forward from the dig-starting position Pw1 of the digging wall 53 toward the terminating edge position Pb3 of the digging wall 53 based on the digging path data for the digging wall (see arrow W1 in FIG. 11).

The processor 26a controls the work implement 13 so that the blade tip position Pb of the blade 18 moves along the first target topography 71b based on the design topography data for the digging wall. As a result, the digging wall 53 is dug.

The processor 26a also controls the work machine 1 so that the work machine 1 travels forward from the terminating edge position Pb3 of the digging wall 53 toward the soil-pile terminating edge position Pb3 based on the digging path data for the digging wall.

The processor 26a controls the work implement 13 so that the blade tip position Pb of the blade 18 moves along the second target topography 72b. As a result, the soil, which is held by the blade 18 after the digging of the digging wall 53 is finished, is disposed in a gap (see FIG. 9) between the soil-pile 54 for the first slot 51 and the soil-pile 55 for the second slot 52.

In step S211, the processor 26a determines whether the load acting on the work implement 13 is equal to or greater than a first threshold Th1.

For example, the processor 26a recognizes the load acting on the work implement 13 and the first threshold Th1 based on the load data acquired from the load sensor 34 and first threshold data which indicates the first threshold Th1.

The first threshold data is recorded in the storage device 28. The first threshold Th1 corresponding to the first threshold data may be a fixed value or may be a variable. Specifically, the first threshold Th1 may be a fixed value or may be a variable as long as the first threshold Th1 is within a range which is able to prevent the work machine 1 and/or the work implement 13 from becoming inoperable.

If the load acting on the work implement 13 is less than the first threshold Th1, the processor 26a advances to step S212. If the load acting on the work implement 13 is equal to or greater than the first threshold Th1, the processor 26a advances to step S301 in FIG. 12.

In step S212, the processor 26a determines whether to finish digging the digging wall 53. For example, when the work machine 1 reaches the soil-pile terminating edge position Pc3, the digging of the digging wall 53 is finished.

The processor 26a may determine to finish digging the digging wall 53 according to an operation of the input device 25b. In addition, the processor 26a may determine to finish the wall dig based on the above construction plan data. Although not illustrated in the drawings, the controller 26a also updates the actual topography data in the wall digging mode in the same way as in step S107.

Figure 12:
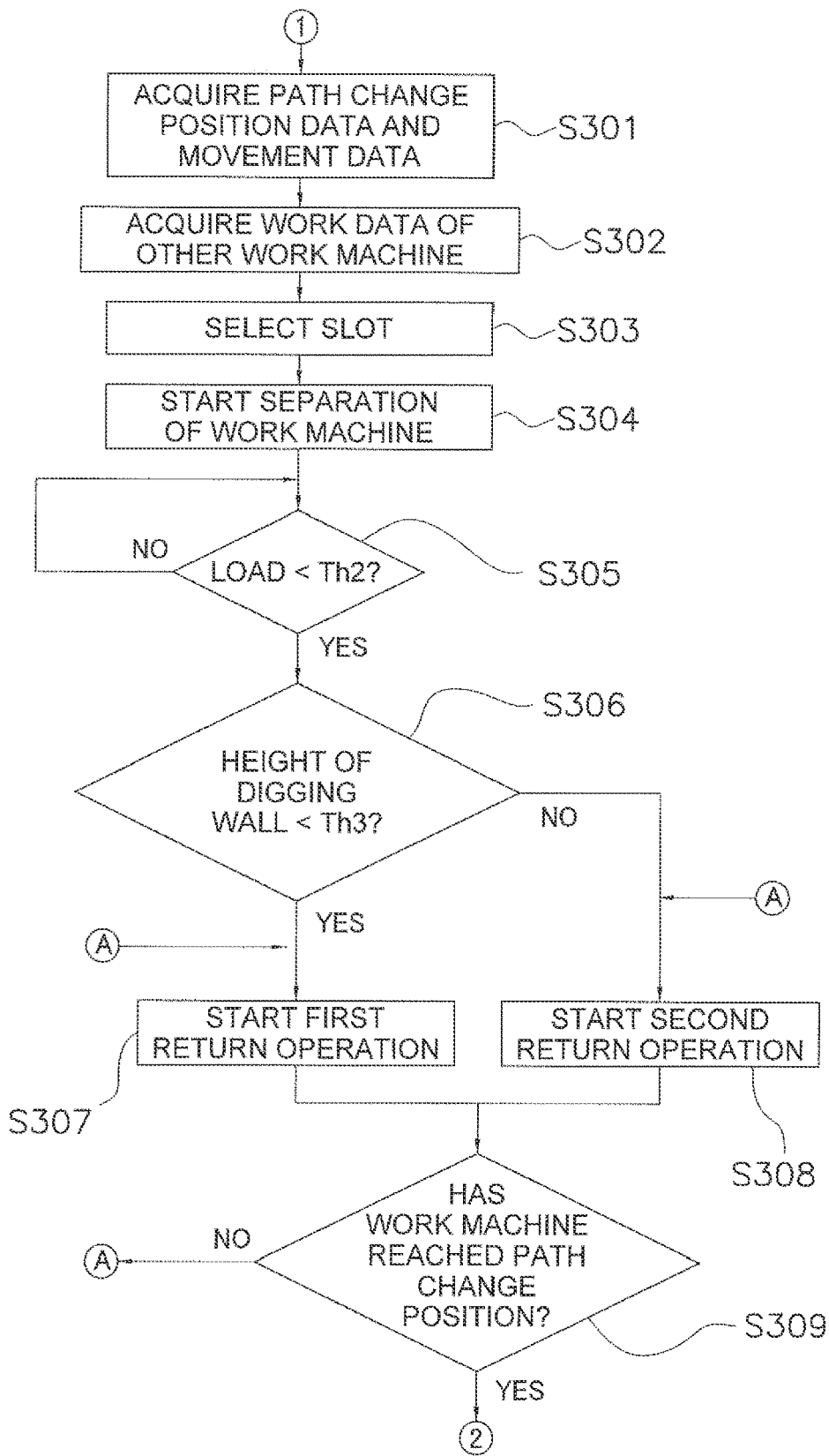
FIG. 12 is a flow chart illustrating processing of a load reduction control of the present embodiment.
Figure 13A:
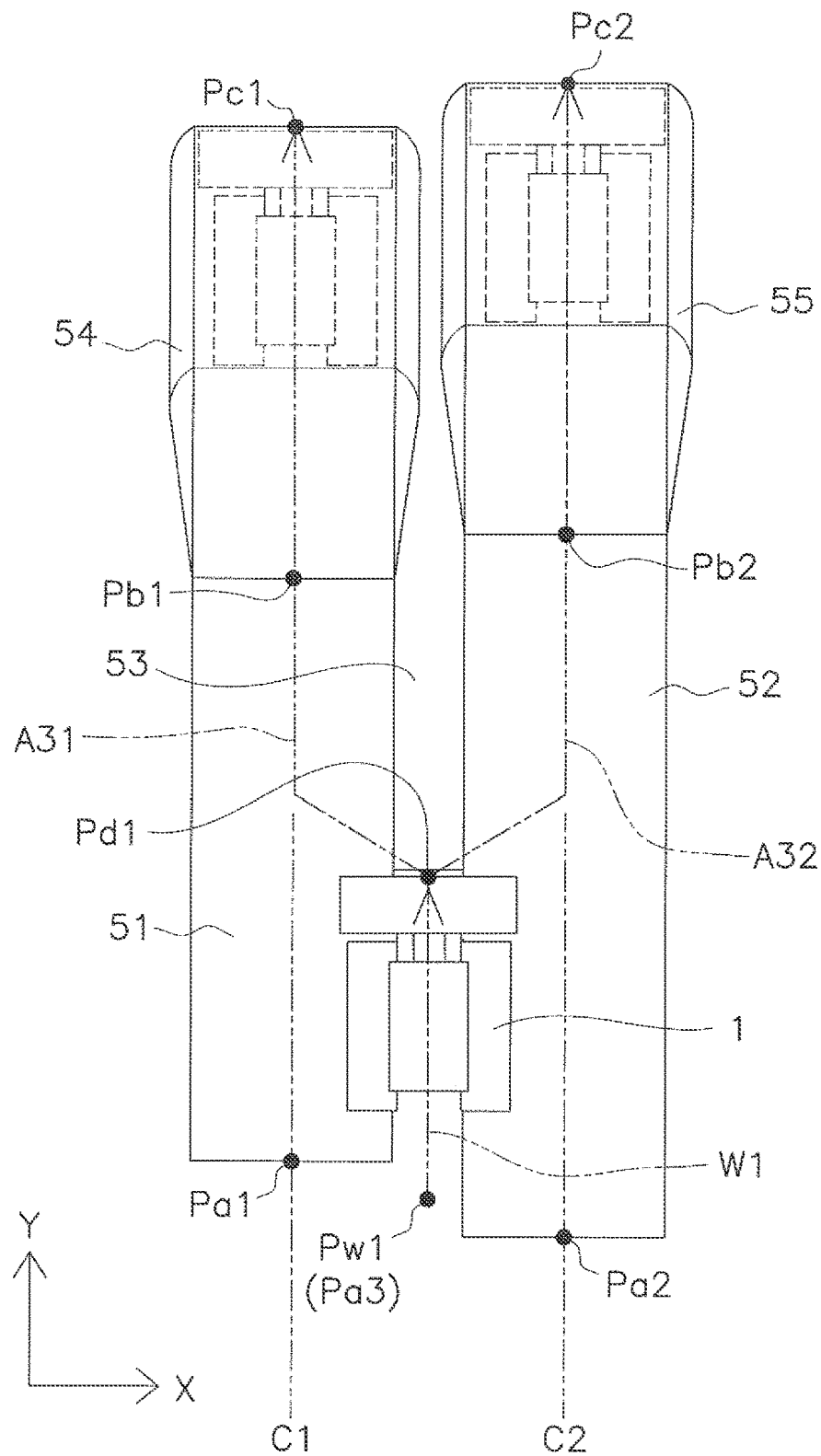
FIG. 13A illustrates a travel path of the work machine during the load reduction control of the present embodiment.

As indicated in the flow chart illustrated in FIG. 12, the processor 26a executes a load reduction control for reducing the load acting on the work implement 13. In the load reduction control, the processor 26a causes the work machine 1 to operate so as to reduce the load acting on the work implement 13. For example as illustrated in FIG. 13A, the processor 26a reduces the load acting on the work implement 13 by changing the travel path of the work machine 1.

In step S301, the processor 26a acquires a path change position Pd1 where the travel path of the work machine 1 is changed, as path change position data. The processor 26a records the path change position data in the storage device 28.

For example, the processor 26a records the position of the work machine 1 when starting to execute the load reduction control, as path change position data in the storage device 28. Specifically, the processor 26a records the position of the work machine 1 at the time that the processor 26a recognizes that the load acting on the work implement 13 is equal to or greater than the first threshold Th1 as the path change position data in the storage device 28.

The path change position Pd1 indicated by the path change position data may be defined by the position of the vehicle body 11 or may be defined by the position of the blade tip of the blade 18. The path change position Pd1 corresponds to the position where the work machine 1 separates from the digging path W1 for the digging wall.

In step S301, the processor 26a also acquires movement data (an example of movement information) for changing the movement direction of the work machine 1 on the digging wall 53. For example, the movement data includes forward travel angle data which is defined using the path change position Pd1 as a reference, and movement distance data which is defined using the path change position Pd1 as a reference. The movement data is recorded in the storage device 28.

In step S302, the processor 26a acquires work data (an example of work information of the other work machine) of the other work machine. As a result, the processor 26a recognizes the working state of the other work machine. For example, the processor 26a acquires the work data of the other work machine by requesting the other work machine for the work data. The processor 26a may also acquire the work data of the other work machine by receiving the work data which is transmitted by the other work machine.

In step S303, the processor 26a selects the work machine 1 from the slots 51 and 52 based on the work data of the other work machine. In this case, the first slot 51 is formed between the digging wall 53 and one digging wall 153 adjacent to the digging wall 53. The second slot 52 is formed between the digging wall 53 and the other digging wall 253 adjacent to the digging wall 53.

In this case, if it is determined that there is the other work machine working at the digging wall 153 and there is no other work machine working at the digging wall 253, the processor 26a selects the second slot 52. If it is determined that there is the other work machine working at the digging wall 253 and there is no other work machine working at the digging wall 153, the processor 26a selects the first slot 51.

As a result, a collision or the like between the work machine 1 and the other work machine can be prevented when the work machine 1 moves from the digging path W1 for the digging wall to the first slot 51 or the second slot 52.

If it is determined that other work machines are not working at both the digging walls 153 and 253 adjacent to the digging wall 53, the processor 26a optionally selects either the first slot 51 or the second slot 52.

In step S304, the processor 26a instructs the work machine 1 to start the separation for reducing the load acting on the work implement 13. For example, the processor 26a causes the work machine 1 to move to the first slot 51 or the second slot 52 based on the above movement data.

For example, the processor 26a causes the work machine 1 to move toward the first slot 51 or the second slot 52 at a predetermined forward travel angle indicated by the forward travel angle data with respect to the traveling direction of the work machine 1 during digging the digging wall 53. The processor 26a also causes the work machine 1 to move toward the first slot 51 or the second slot 52 by the movement distance indicated by the movement distance data with a straight line that extends in the traveling direction of the work machine 1 during digging the digging wall 53 as a reference.

As a result, the work machine 1 separates from the digging path W1 for the digging wall and moves to the first slot 51 or the second slot 52. When the work machine 1 includes moved to the first slot 51, the processor 26a causes the work machine 1 to move in the direction from the starting edge position Pa1 toward the terminating edge position Pb1 of the first slot 51. Conversely, when the work machine 1 includes moved to the second slot 52, the processor 26a causes the work machine 1 to move from the starting edge position Pa2 toward the terminating edge position Pb2 of the second slot 52.

In FIG. 13A, the separation paths of the first and second slots 51 and 52 are respectively indicated by "A31" and "A32."

The work machine 1 performs a return operation due to the processing from step S305 to step S309. Specifically, the work machine 1 performs the return operation due to the processing (described below) from "yes" of the step S305 to step S309. When "no" selects in the step S305, the work machine 1 starts the return operation when the soil held on the blade 18 is discharged.

In step S305, the processor 26a determines whether the load acting on the work implement 13 is less than a second threshold Th2. The determination in this case is for the purpose of determining whether the soil held by the blade 18 is discharged from the blade 18. The second threshold Th2 is smaller than the first threshold Th1.

For example, the processor 26a recognizes the load acting on the work implement 13 and the second threshold Th2 based on the load data acquired from the load sensor 34 and second threshold data which indicates the second threshold Th2. The second threshold data is recorded in the storage device 28. The second threshold Th2 indicated by the second threshold data may be a fixed value or may be a variable.

When the load acting on the work implement 13 is less than the second threshold Th2 (Yes in step S305), the processor 26a advances to step S306. For example, the processor 26a determines that the soil held by the blade 18 includes been discharged from the blade 18 and advances to step S306. As a result, the work machine 1 starts the return operation.

If the load acting on the work implement 13 is equal to or greater than the second threshold Th2 (No in step S305), the processor 26a monitors the load acting on the work implement 13 until the load acting on the work implement 13 becomes less than the second threshold Th2. For example, the processor 26a determines that the soil held by the blade 18 is still being held by the blade 18 and monitors the load acting on the work implement 13 until the soil is discharged from the blade 18.

In this state, the work machine 1 moves along the first slot 51 or the second slot 52 until the soil held by the blade 18 is discharged. When the soil held by the blade 18 is discharged, the work machine 1 starts the return operation.

When the work machine 1 starts the return operation, the processor 26a selects the return path according to the current height of the digging wall 53. For example, in step S306, the processor 26a determines whether the current height of the digging wall 53 is less than a third threshold Th3. For example, the processor 26a recognizes the current height of the digging wall 53 and the third threshold Th3 based on fourth height data which indicates the current height of the digging wall 53 and third threshold data which indicates the third threshold Th3.

The third threshold data is recorded in the storage device 28. The third threshold Th3 indicated by the third threshold data may be a fixed value or may be a variable.

When the current height of the digging wall 53 is less than the third threshold Th3, the processor 26a causes the work machine 1 to reach the path change position Pd1 by traveling in reverse. In other word, in step S307, the processor 26a causes the work machine 1 to reach the path change position Pd1 by a first return operation.

If the current height of the digging wall 53 is equal to or greater than the third threshold Th3, the processor 26a causes the work machine 1 to travel in reverse until passing the path change position Pd1, and thereafter causes the work machine 1 to reach the path change position Pd1 by travelling forward. In other word, in step S308, the processor 26a causes the work machine 1 to reach the path change position Pd1 by a second return operation.

In step S309, the processor 26a determines whether the work machine 1 includes reached the path change position Pd1. For example, the processor 26a determines whether the work machine 1 includes reached the path change position Pd1 based on the current position data.

When the position of the work machine 1 indicated by the current position data matches the path change position Pd1 within a predetermined range, the processor 26a determines that the work machine 1 includes reached the path change position Pd1. According to the above determination, the work machine 1 finishes the return operation and the processor 26a executes the process in step S210. As a result, the digging of the digging wall 53 is restarted.

When the position of the work machine 1 indicated by the current position data is outside of the predetermined range, the processor 26a determines that the work machine 1 includes not yet reached the path change position Pd1. In this case, the processor 26a monitors the position of the work machine 1 until the position of the work machine 1 matches the path change position Pd1 in the predetermined range.

In the control system 3 of the work machine according to the above present embodiment, the work machine 1 is able to automatically dig the digging wall 53. Moreover, when the load acting on the work implement 13 becomes large during digging the digging wall 53, the load acting on the work implement 13 can be reduced, because the processor 26a causes the work machine 1 to move to the first slot 51 or the second slot 52. (Modified examples of the embodiment)

(A) As a modified example of the above embodiment, the processor 26a may instruct the work machine 1 to start the separation for reducing the load acting on the work implement 13 as follows In step S301, the processor 26a recognizes the path change position Pd1 as the path change position data and records the path change position data in the storage device 28.

In step S301, the processor 26a also acquires movement data (an example of movement information) for changing the movement direction of the work machine 1 on the digging wall 53. The movement data includes slot center data (an example of first coordinate information) which indicates the positions of the center lines of the first slot 51 and the second slot 52.

The processor 26a recognizes the slot center data based on the actual topography data. The slot center data includes first coordinate data which indicates the position of a center line C1 of the first slot 51, and second coordinate data which indicates the position of a center line C2 of the second slot 52.

In FIG. 13A, the center line of the first slot 51 is indicated by "C1." The center line of the second slot 52 is indicated by "C2." As illustrated in FIG. 13A, the X-axis direction and the Y-axis direction are defined.

The present modified example illustrates an example where the center line C1 of the first slot 51 and the center line C2 of the second slot 52 extend in the Y-axis direction. In this case, the X-axis direction is perpendicular to the Y-axis direction and corresponds to the width direction of the first and second slots 51 and 52.

While the present modified example illustrates an example in which the center line C1 of the first slot 51 and the center line C2 of the second slot 52 extend in the Y-axis direction, the center line C1 of the first slot 51 and the center line C2 of the second slot 52 may extend in a direction perpendicular to the Y-axis.

The first coordinate data includes coordinate data (X-coordinate and Y-coordinate data) on the center line C1 of the first slot 51. The second coordinate data includes coordinate data (X-coordinate and Y-coordinate data) on the center line C2 of the second slot 52.

The processor 26a also acquires the current position data generated by the GNSS receiver 32. The current position data includes the coordinate data (X-coordinate and Y-coordinate data) of the current position of the work machine 1.

The processes of step S302 and step S303 are the same as the above embodiment and are therefore omitted.

In step S304, the processor 26a causes the work machine 1 to move to the first slot 51 or the second slot 52 based on the slot center data and the current position data.

For example, the processor 26a causes the work machine 1 to move from the path change position Pd1 toward the center line C1 of the first slot 51 based on the coordinate data of the current position data and the coordinate data which indicates the position of the center line C1 of the first slot 51.

The processor 26a also causes the work machine 1 to move from the path change position Pd1 toward the center line C2 of the second slot 52 based on the coordinate data of the current position data and the coordinate data which indicates the position of the center line C2 of the second slot 52.

Specifically, when the work machine 1 moves toward the center line C1 of the first slot 51, the processor 26a changes the movement direction of the work machine 1 toward the center line C1 of the first slot 51 by causing the blade 18 of the work machine 1 to be tilted. Moreover, the processor 26a causes the work machine 1 to move so that the X-coordinate data of the current position data approaches the X-coordinate data that defines the center line C1 of the first slot 51.

Furthermore, when the X-coordinate data of the current position data is sufficiently close to the X-coordinate data of the first coordinate data, the processor 26a causes the blade 18 of the work machine 1 to be tilted in the reverse direction and causes the blade 18 to come into contact with the digging wall 53. The movement direction of the work machine 1 is changed to the direction along the center line C1 of the first slot 51 due to the reaction force of the blade 18 acting from the digging wall 53. Thereafter, the processor 26a causes the work machine 1 to move in the direction from the starting edge position Pa1 toward the terminating edge position Pb1 of the first slot 51.

The situation in which the work machine 1 moves toward the center line C2 of the second slot 52 is the same as that of the situation the work machine 1 moves toward the center line C1 of the first slot 51 as indicated above, except for the form of changing the movement direction of the work machine 1. In this case, when the X-coordinate data of the current position data includes become sufficiently close to the X-coordinate data of the second coordinate data, the processor 26a instructs the work machine 1 to change the tilting direction of the blade 18 of the work machine 1 in the opposite direction to the tilting direction described above, whereby the movement direction of the work machine 1 changes to the direction along the center line C2 of the second slot 52. Thereafter, the processor 26a causes the work machine 1 to move in the direction from the starting edge position Pa2 toward the terminating edge position Pb2 of the second slot 52.

When the work machine 1 moves along the center line C1 of the first slot 51 or the center line C2 of the second slot 52 as described above, the X-coordinate data of the current position data may not perfectly match the X-coordinate data of the first coordinate data or the X-coordinate data of the second coordinate data.

In this case, the processor 26a causes the work machine 1 to move along the center line C1 of the first slot 51.

For example, the processor 26a calculates a first differential between the width data of the first slot 51 and blade data which indicates the width of the blade 18. The processor 26a calculates first range data by adding or subtracting ½ of the first differential to or from the X-coordinate data of the first coordinate data.

The processor 26a causes the blade 18 of the work machine 1 to be tilted in the reverse direction to the outside of the first range so that the X-coordinate data of the current position data is included in the first range data. As a result, the movement direction of the work machine 1 is changed to the direction along the center line C1 of the first slot 51. In addition, the X-coordinate data of the current position data is positioned inside the first range due to the change of the movement direction. In the above state, the processor 26a causes the work machine 1 to move in the direction from the starting edge position Pa1 toward the terminating edge position Pb1 of the first slot 51 inside the first range.

When the processor 26a causes the work machine 1 to move along the center line C2 of the second slot 52, the processor 26a calculates second range data in the same way as described above. In this case, the processor 26a causes the work machine 1 to move in the direction from the starting edge position Pa2 toward the terminating edge position Pb2 of the second slot 52 inside the second range.

The work machine 1 is able to automatically dig the digging wall 53 even with the above configuration. Moreover, when the load acting on the work implement 13 becomes large during digging the digging wall 53, the load acting on the work implement 13 can be reduced, because the processor 26a causes the work machine 1 to move to the first slot 51 or the second slot 52.

(B) As a modified example of the above embodiment, the processor 26a may instruct the work machine 1 to start the separation for reducing the load acting on the work implement 13 as follows.

In step S301, the processor 26a recognizes the path change position Pd1 as the path change position data and records the path change position data in the storage device 28.

In step S301, the processor 26a also acquires movement data (an example of movement information) for changing the movement direction of the work machine 1 on the digging wall 53. The movement data includes side edge data (an example of second coordinate information) which indicates the positions of the slot edges at the digging wall 53 side in the first and second slots 51 and 52.

Figure 13B:
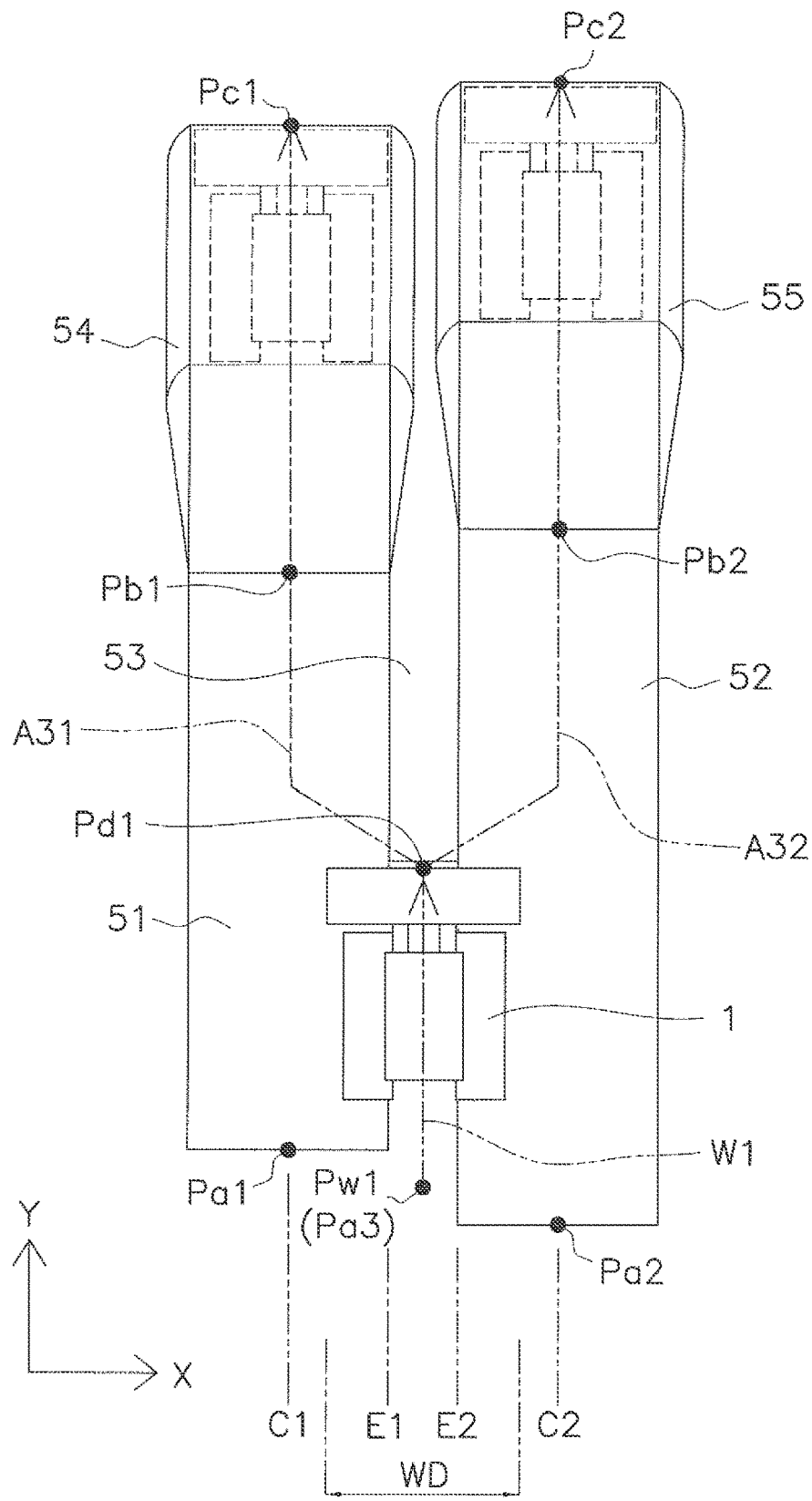
FIG. 13B illustrates a travel path of the work machine during a modified example of the load reduction control of the present embodiment.

In FIG. 13B, the slot edge of the first slot 51 is indicated by "E1." The slot edge of the second slot 52 is indicated by "E2." The width of the blade 18 is indicated by "WD."

For example, the processor 26a recognizes the side edge data based on the actual topography data. The side edge data includes X-coordinate data which indicates the position of the slot edge E1 at the digging wall 53 side in the first slot 51, and X-coordinate data which indicates the position of the slot edge E2 at the digging wall 53 side in the second slot 52.

The processor 26a also acquires the current position data generated by the GNSS receiver 32. The current position data includes the coordinate data (X-coordinate and Y-coordinate data) of the current position of the work machine 1. Furthermore, the processor 26a acquires blade data (an example of width data) which indicates the width of the blade 18 and is recorded in the storage device 28.

The processes of step S302 and step S303 are the same as the above embodiment and are therefore omitted.

In step S304, the processor 26a causes the work machine 1 to move from the path change position Pd1 toward the slot edge E1 or E2 based on the side edge data and the current position data. The processor 26a also causes the work machine 1 to move from the slot edge E1 or E2 toward the center line C1 or C2 of the first or second slot 51 or 52 based on the blade data.

For example, the processor 26a causes the work machine 1 to move from the path change position Pd1 to the slot edge E1 of the first slot 51 based on the coordinate data (X-coordinate data and Y-coordinate data) of the current position of the work machine 1 and the side edge data (X-coordinate data which indicates the position of the slot edge E1 at the digging wall 53 side in the first slot 51). The processor 26a also causes the work machine 1 to move from the slot edge E1 of the first slot 51 toward the center line C1 of the first slot 51 by ½ of the width WD of the blade 18. As a result, the work machine 1 is positioned in the first slot 51. In the above state, the processor 26a causes the work machine 1 to move in the direction from the starting edge position Pa1 toward the terminating edge position Pb1 of the first slot 51.

For example, the processor 26a causes the work machine 1 to move from the path change position Pd1 to the slot edge E2 of the second slot 52 based on the coordinate data (X-coordinate data and Y-coordinate data) of the current position of the work machine 1 and the side edge data (X-coordinate data which indicates the position of the slot edge E2 at the digging wall 53 side in the second slot 52). The processor 26a also causes the work machine 1 to move from the slot edge E2 of the second slot 52 toward the center line C2 of the second slot 52 by ½ of the width WD of the blade 18. As a result, the work machine 1 is positioned in the first slot 52. In the above state, the processor 26a causes the work machine 1 to move in the direction from the starting edge position Pa2 toward the terminating edge position Pb2 of the second slot 52.

When the work machine 1 separates from the path change position Pd1 and moves toward the first or second slot 51 or 52, it is necessary to change the movement direction of the work machine 1. The changing of the movement direction of the work machine 1 is performed in the same way as in modified example (A).

The X-coordinate data of the slot edges E1 and E2 of the respective first and second slots 51 and 52 may be calculated based on the X-coordinate data which indicates the positions of the center lines C1 and C2 of the respective first and second slots 51 and 52 and slot width data which indicates the widths of the first and second slots 51 and 52.

The work machine 1 is able to automatically dig the digging wall 53 even with the above configuration. Moreover, when the load acting on the work implement 13 becomes large during digging the digging wall 53, the load acting on the work implement 13 can be reduced, because the processor 26a causes the work machine 1 to move to the first slot 51 or the second slot 52.

(C) As a modified example of the above embodiment, the processor 26a may instruct the work machine 1 to start the separation for reducing the load acting on the work implement 13 as follows.

Figure 15:
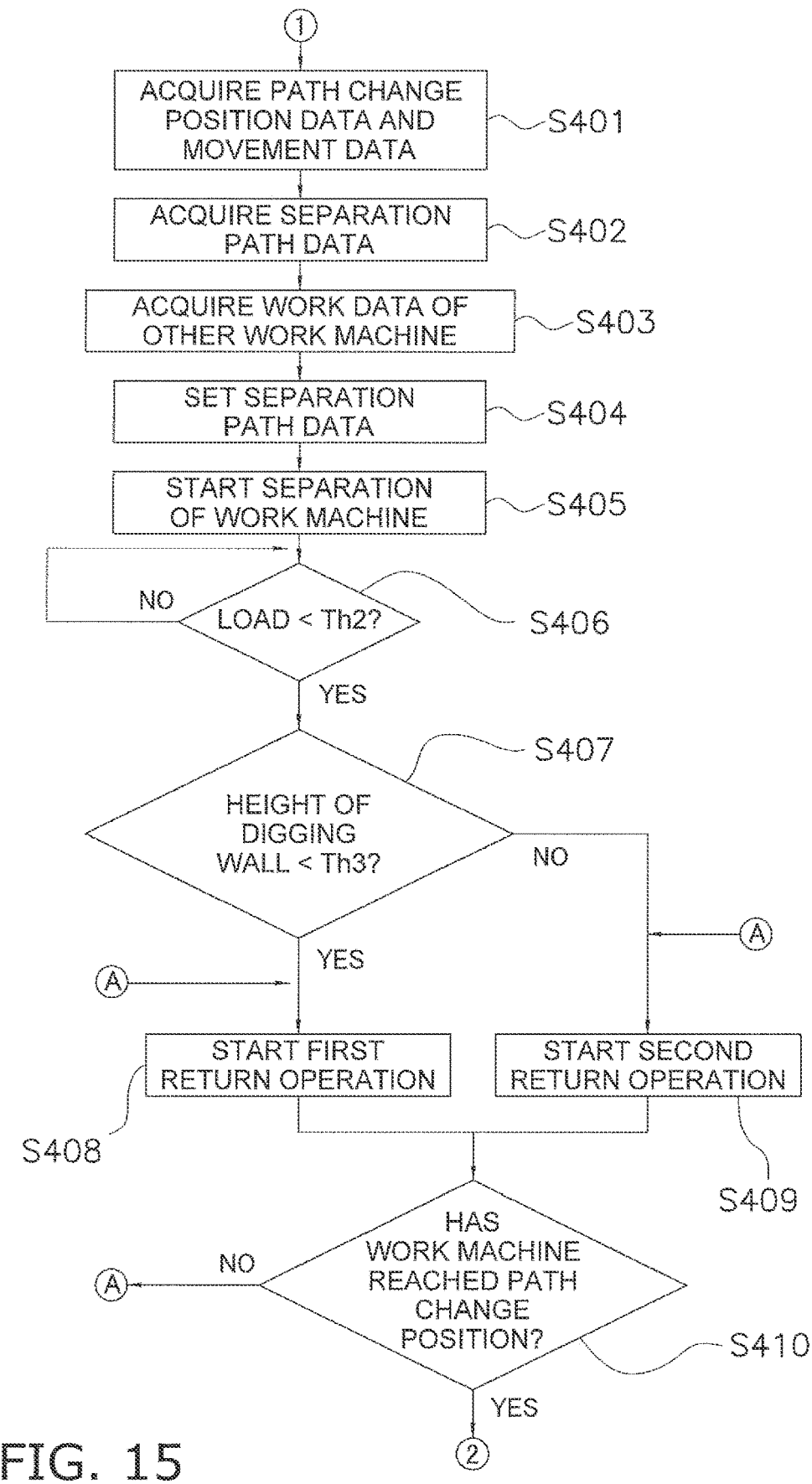
FIG. 15 is a flow chart illustrating a modified example of processing of the load reduction control of the present embodiment.

As illustrated in the flow chart illustrated in FIG. 15, the processor 26a executes the load reduction control for reducing the load acting on the work implement 13. For example as illustrated in FIG. 13A, the processor 26a reduces the load acting on the work implement 13 by changing the travel path of the work machine 1.

The process in step S401 is the same as the process of the above step S301.

In step S402, the processor 26a acquires separation path data (example of second path information). The separation path data includes at least one of first separation path data which indicates a first separation path A31 and second separation path data which indicates a second separation path A32.

The first separation path A31 is a path which includes the first slot 51 adjacent to the digging wall 53. The second separation path A32 is a path which includes the second slot 52 adjacent to the digging wall 53. The first and second separation paths A31 and A32 are paths which is used for reducing the load acting on the work implement 13.

The processor 26a sets the separation path data based on the actual topography data of the first and second slots 51 and 52 adjacent to the digging wall 53, and the above movement data. The actual topography data used in this situation is an example of slot information.

For example, the separation path includes the first separation path A31 and the second separation path A32. The first separation path A31 is defined by the path change position Pd1, the starting edge position Pa1 of the first slot 51, the terminating edge position Pb1 of the first slot 51, and the soil-pile terminating edge position Pc1.

The forward travel angle from the path change position Pd1 toward the path between the starting edge position Pa1 of the first slot 51 and the terminating edge position Pb1 of the first slot 51 in the first separation path A31 is set based on the forward travel angle data. The distance from the path change position Pd1 to the path between the starting edge position Pa1 of the first slot 51 and the terminating edge position Pb1 of the first slot 51 is set based on the movement distance data.

The movement distance data may be set based on the forward travel angle data, the dig-starting edge position data of the first slot 51, and the dig-terminating edge position data of the first slot 51.

The second separation path A32 is defined by the path change position Pd1, the starting edge position Pa2 of the second slot 52, the terminating edge position Pb2 of the second slot 52, and the soil-pile terminating edge position Pc2.

The forward travel angle from the path change position Pd1 to the path between the starting edge position Pa2 of the second slot 52 and the terminating edge position Pb2 of the second slot 52 in the second separation path A32 is set based on the forward travel angle data. The distance from the path change position Pd2 to the path between the starting edge position Pa2 of the second slot 52 and the terminating edge position Pb2 of the second slot 52 is set based on the movement distance data.

The movement distance data may be set based on the forward travel angle data, the dig-starting edge position data of the second slot 52, and the dig-terminating edge position data of the second slot 52.

The data corresponding to the positions Pd1, Pa1, Pb1, and Pc1 for defining the first separation path A31 are recorded in the storage device 28 as the first separation path data. The data corresponding to the positions Pd1, Pa2, Pb2, and Pc21 for defining the second separation path A32 are recorded in the storage device 28 as the second separation path data.

Specifically as illustrated in FIG. 13A, the first separation path A31 includes a path from the path change position Pd1 toward the straight line that connects the starting edge position Pa1 of the first slot 51 and the terminating edge position Pb1 of the first slot 51, and the path from the starting edge position Pa1 of the first slot 51 to the terminating edge position Pb1 of the first slot 51. The first separation path A31 further includes the path from the terminating edge position Pb1 of the first slot 51 to the soil-pile terminating edge position Pc1 of the first slot 51.

The second separation path A32 includes a path from the path change position Pd1 toward the straight line that connects the starting edge position Pa2 of the second slot 52 and the terminating edge position Pb2 of the second slot 52, and the path from the starting edge position Pa2 of the second slot 52 to the terminating edge position Pb2 of the second slot 52. The second separation path A32 further includes the path from the terminating edge position Pb2 of the second slot 52 to the soil-pile terminating edge position Pc2 of the second slot 52.

The process in step S403 is the same as the process of the above step S302.

In step S404, the processor 26a sets the separation path data based on the work data of the other work machine. For example, the processor 26a determines whether the other work machine is working on either of the pair of digging walls 153 and 253 (see FIG. 4) adjacent to the digging wall 53, based on the operation data of the other work machine.

In this case, if it is determined that there is the other work machine working at the digging wall 153 and there is no other work machine working at the digging wall 253, the processor 26a selects the second separation path A32 of the second slot 52 side, for example, the second separation path data.

If it is determined that there is the other work machine working at the digging wall 253 and there is no other work machine working at the digging wall 153, the processor 26a selects the first separation path A31 of the first slot 51 side, for example, the first separation path data.

The process in step S405 is the same as the process of the above step S304. The work machine 1 separates from the digging path W1 for the digging wall to move and the first separation path A31 or the second separation path A32.

When the work machine 1 separates, the processor 26a causes the work machine 1 to move from the path change position Pd1 toward the terminating edge position Pb1 of the first slot 51 or the terminating edge position Pb2 of the second slot 52 based on the first separation path data or the second separation path data.

The processor 26a also causes the work machine 1 to move from the terminating edge position Pb1 of the first slot 51 or the terminating edge position Pb2 of the second slot 52 toward the soil-pile terminating edge position Pc1 of the first slot 51 or the soil-pile terminating edge position Pc2 of the second slot 52, based on the first separation path data or the second separation path data.

The processes in step S406 and step S407 are respectively the same as the processes of the above step S305 and step S306.

Figure 14:
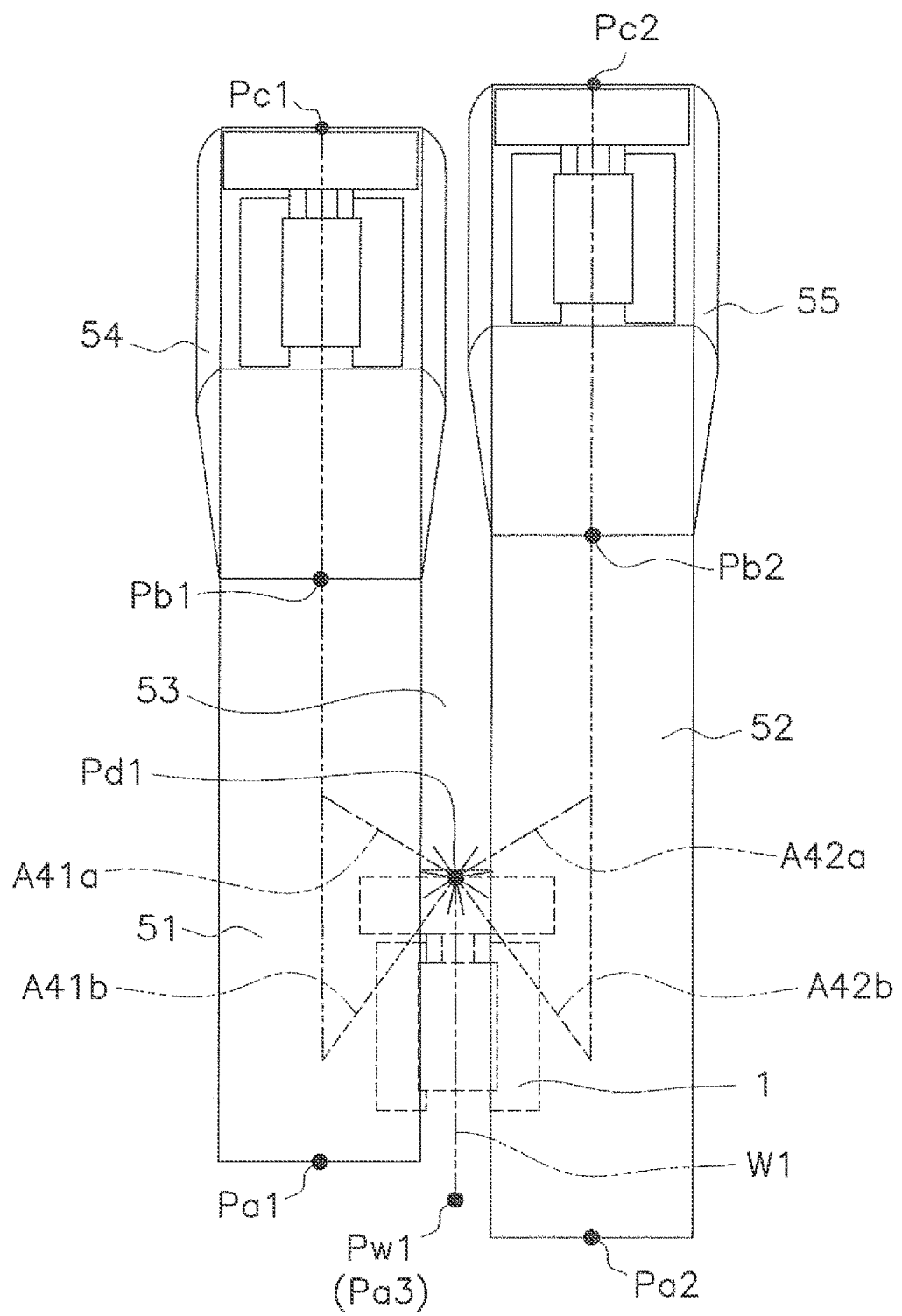
FIG. 14 illustrates a return path of the work machine during the load reduction control of the present embodiment.

In step S408, the processor 26a causes the work machine 1 to reach the path change position Pd1 by the first return operation. For example, when the current height of the digging wall 53 is less than the third threshold Th3 (Yes in step S407), the processor 26a sets the first return path (see A41a and A42a in FIG. 14), for causing the work machine 1 to travel in reverse to reach the path change position Pd1, as the return path (S408).

In step S409, the processor 26a causes the work machine 1 to reach the path change position Pd1 by the second return operation. For example, when the current height of the digging wall 53 is equal to or greater than the third threshold Th3, the processor 26a sets the second return path (see A41b and A42b in FIG. 14), for causing the work machine 1 to travel in reverse until passing the path change position Pd1 and thereafter causes the work machine 1 to reach the path change position Pd1 by travelling forward, as the return path (S409).

Specifically, the processor 26a acquires return path data (an example of third path information) in step S408 and step S409. For example, the return path data includes first return path data and second return path data.

The first return path data indicates the first return paths A41a and A42a for causing the work machine 1 to reach the path change position Pd1 by travelling in reverse.

Specifically, the first return path data is configured by data which indicates the path change position Pd1, the terminating edge position Pb1 of the first slot 51, the soil-pile terminating edge position Pc1 of the first slot 51, and the starting edge position Pa1 of the first slot 51. The first return path data is recorded in the storage device 28. The processor 26a recognizes the first return paths A41a and A42a based on the first return path data.

The second return path data indicates second return paths A41b and A42b, for causing the work machine 1 to travel in reverse until passing the path change position Pd1 and thereafter cause the work machine 1 to reaching the path change position Pd1 by travelling forward.

Specifically, the second return path data is configured by data which indicates the path change position Pd1, the terminating edge position Pb2 of the second slot 52, the soil-pile terminating edge position Pc2 of the second slot 52, and the starting edge position Pa2 of the second slot 52. The second return path data is recorded in the storage device 28. The processor 26a recognizes the second return paths A41b and A42b based on the second return path data.

The processor 26a causes the work machine 1 to move along the return paths based on the above return path data.

For example, the processor 26a refers to the return path data (the first return path data or the second return path data) recorded in the storage device 28 and instructs the work machine 1 to perform the return operation for causing the work machine 1 to operate along the return path corresponding to the return path data. As a result, the work machine 1 moves along the return path.

For example, when the processor 26a recognizes the first return path A41a or A42a as the return path, the processor 26a first causes the work machine 1 to travel in reverse from the dig-terminating edge position Pb1 or Pb2 or the soil-pile terminating edge position Pc1 or Pc2, toward the dig-starting edge position Pa1 or Pa2. The processor 26a then causes the work machine 1 to travel diagonally toward the path change position Pd1 in the vicinity of the path change position Pd1. In this way, the work machine 1 reaches the path change position Pd1.

When the processor 26a recognizes the second return path A41b or A42b as the return path, the processor 26a first causes the work machine 1 to travel in reverse from the dig-terminating edge position Pb1 or Pb2 or the soil-pile terminating edge position Pc1 or Pc2, toward the dig-starting edge position Pa1 or Pa2. The processor 26a then causes the work machine 1 to travel in reverse until the work machine 1 passes the path change position Pd1.

Finally, the processor 26a causes the work machine 1 to travel forward toward the path change position Pd1. At this time, the processor 26a positions the work machine 1 between the dig-starting position Pw1 of the digging wall 53 and the terminating edge position Pb3 of the digging wall 53 and thereafter causes the work machine 1 to travel forward toward the path change position Pd1. The processor 26a also may cause the work machine 1, which is positioned between the dig-starting edge position Pa1 or Pa2 and the dig-terminating edge position Pb1 or Pb2, to travel forward while traveling diagonally toward the path change position Pd1.

The process in step S410 is the same as the process of the above step S309.

The work machine 1 is able to automatically dig the digging wall 53 even with the above configuration. Moreover, when the load acting on the work implement 13 becomes large during digging the digging wall 53, the load acting on the work implement 13 can be reduced, because the processor 26a causes the work machine 1 to move to the first slot 51 or the second slot 52. In addition, when the load acting on the work implement 13 is reduced, the work machine 1 is able to return to the digging of the digging wall 53.

(The Other Embodiments)

Although an embodiment of the present invention includes been described so far, the present invention is not limited to the above embodiment and various modifications may be made within the scope of the invention.

(a) The work machine 1 described in the above embodiment is not limited to a bulldozer, and may be the other type of work machine such as a wheel loader, a motor grader, a hydraulic shovel, or the like. The work machine 1 may be driven by an electric motor. The actual topography may include materials such as rocks or iron ore or the like.

(b) The work machine 1 described in the above embodiment may be a work machine that can be operated remotely. In this case, a portion of the control system may be disposed outside of the work machine 1. For example, the processor 26a may be disposed outside of the work machine 1 and disposed in a control center separate from the work site. in this case, the work machine 1 may not be provided with the operator's cab 14.

Figure 16:
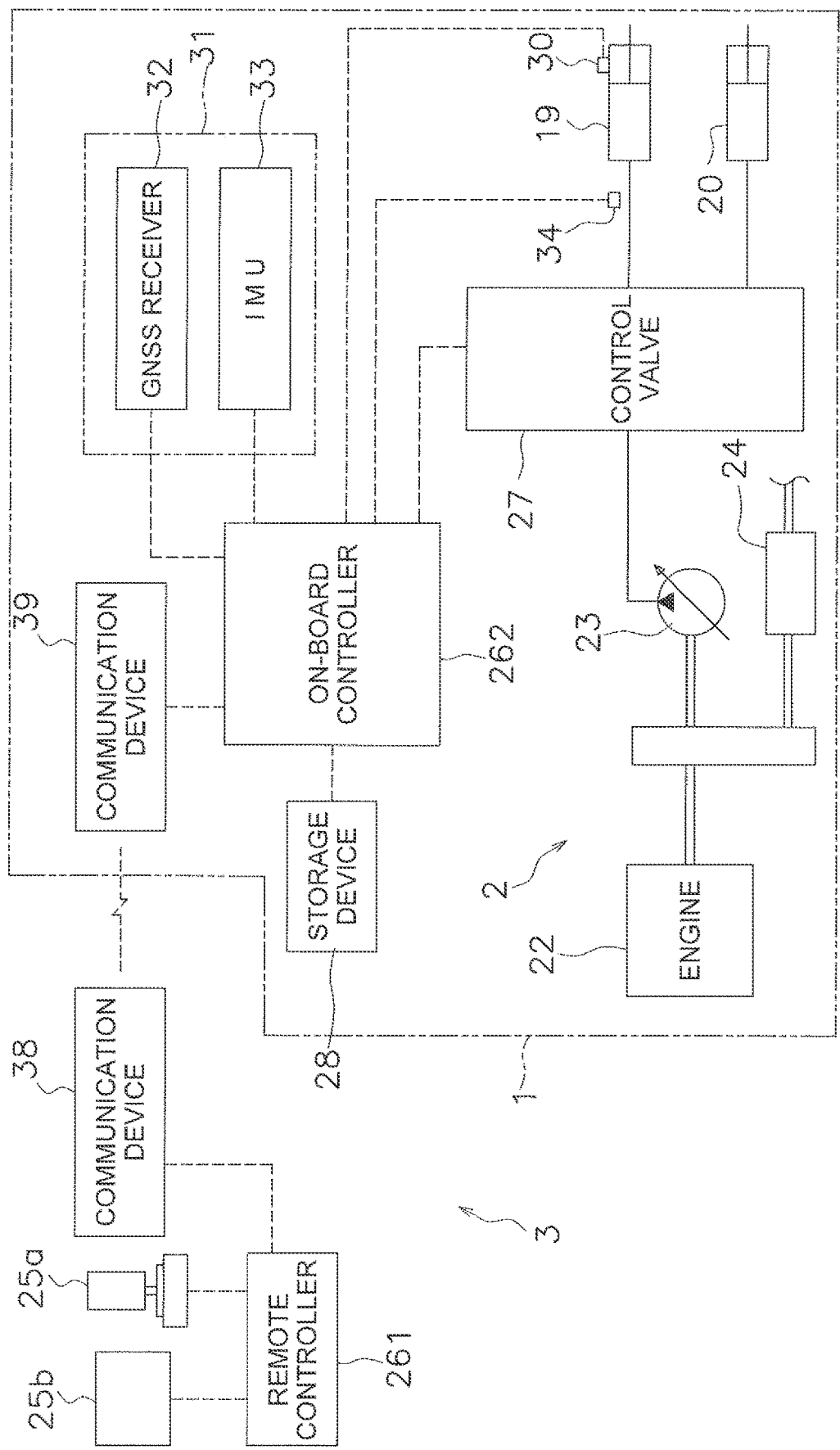
FIG. 16 is a block diagram illustrating configurations of the drive system and the control system of the work machine according to the other embodiment.

(c) The controller 26 described in the above embodiment may include a plurality of controllers 261 and 262 as illustrated in FIG. 16. For example, the controller 26 may include a remote controller 261 disposed outside of the work machine and an on-board controller 262 mounted in the work machine.

In this case, the remote controller 261 and the on-board controller 262 are configured to communicate wirelessly by communication devices 38 and 39. In this case, a portion of the functions of the above controller 26 are executed by the remote controller 261 and the other functions of the above controller 26 are executed by the on-board controller 262.

For example, the processing for setting the target design topography 70 is executed by the remote controller 261, and the processing for instructing the operating commands to the travel device 12, the work implement 13, the engine 22, and the power transmission device 24, etc. is executed by the on-board controller 262.

(d) The method for determining the target design topography 70 described in the above embodiment is not limited to the method of the above embodiment and may be modified. For example, the processor 26a may determine the target design topography 70 based on the other parameter such as the load on the work implement 13, a target angle, a target position, and the like. Alternatively, the target design topography 70 may be determined in advance with the construction plan data.

(e) The operating device 25a and the input device 25b described in the above embodiment may be disposed outside of the work machine 1. In this case, the operator's cab 14 may be omitted from the work machine 1. In addition, the operating device 25a and the input device 25b may be omitted from the work machine 1.

Figure 17:
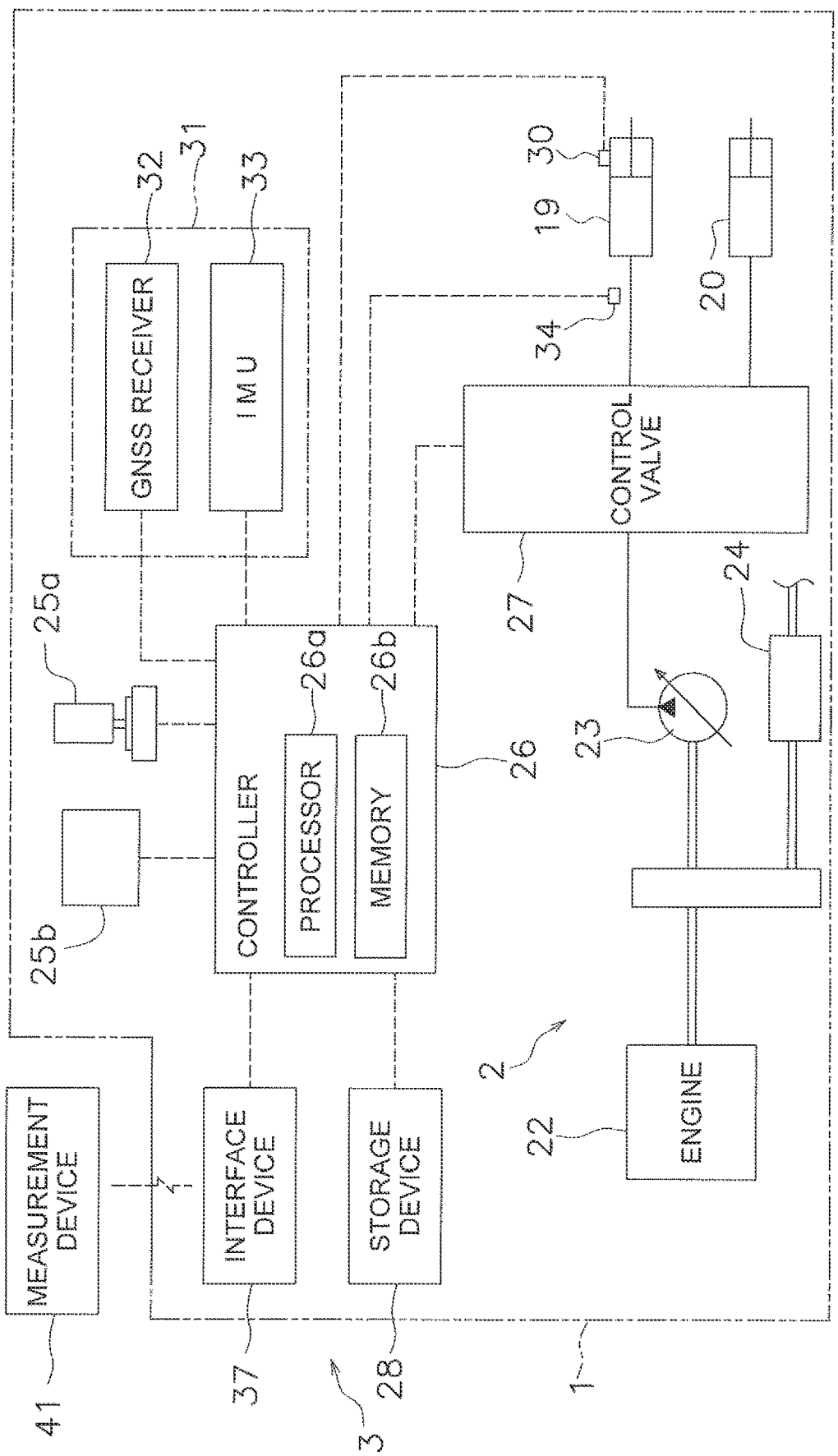
FIG. 17 is a block diagram illustrating configurations of the drive system and the control system of the work machine according to the other embodiment.

(f) The actual topography 50 described in the above embodiment is not limited to being acquired with the above positional sensor 31 and may be acquired with the other device. For example, as illustrated in FIG. 17, the topography 50 may be acquired with an interface device 37 that receives data from an external device. The interface device 37 may wirelessly receive the actual topography data which is measured by an external measurement device 41. Alternatively, the interface device 37 may include a reading device for reading a recording medium and may acquire the actual topography data, which is measured by the external measurement device 41, via the recording medium.

(g) The control forms of the slot digging mode and the wall digging mode described in the above embodiment are not limited to the forms of the above embodiment. For example, the digging of the digging wall 53 formed between the two slots 51 and 52 is performed after the slots 51 and 52 are formed in the above embodiment. However, the digging of a plurality of digging walls between three or more slots may be performed after the three or more slots are formed.

(h) The work range data may be set by the operator operating the input device 25b in the wall digging mode described in the above embodiment. The processor 26a may also set one of a lateral position of the dig-starting edge position Pa1 of the first slot 51 and a lateral position of the dig-starting edge position Pa2 of the second slot 52, as the dig-starting edge position of the digging wall 53.

The processor 26a may also set one of a lateral position of the dig-terminating edge position Pb1 of the first slot 51 and a lateral position of the dig-terminating edge position Pb2 of the second slot 52, as the dig-terminating edge position of the digging wall 53. The processor 26a may also set one of a lateral position of the soil-pile terminating edge position Pd of the first slot 51 and a lateral position of the soil-pile terminating edge position Pc2 of the second slot 52, as the soil-pile terminating edge position of the digging wall 53.

(i) While the above embodiment describes the example of the processor 26a determining the digging height of the digging wall 53 from the greatest height among the first slot 51 and the second slot 52, the digging height of the digging wall 53 may also be determined from the smallest height among the first slot 51 and the second slot 52. The processor 26a may also determine the digging height of the digging wall 53 from an intermediate value of the height of the first slot 51 and the height of the second slot 52.

According to the present invention, a digging wall can be dug automatically.

What is claimed is:

1. A system for controlling a work machine including a work implement, the system comprising:
   a load sensor configured to detect a load acting on the work implement; and
   a processor configured to control the work machine to dig a digging wall formed between adjacent slots,
   the processor being configured to move the work machine to either one of the adjacent slots adjacent to the digging wall when the load during digging the digging wall is equal to or greater than a first threshold.

2. The system according to claim 1, wherein the processor is further configured to
   acquire movement information in order to change a movement direction of the work machine, and move the work machine to either one of the adjacent slots based on the movement information.

3. The system according to claim 2, wherein
the movement information includes first coordinate information indicative of a position of a center line of the adjacent slot, and
the processor is further configured to
acquire the first coordinate information, and
move the work machine from a current position of the work machine to the center line of the adjacent slot based on the first coordinate information when the load during digging the digging wall is equal to or greater than the first threshold.

4. The system according to claim 2, wherein
the movement information includes second coordinate information indicative of a position of a slot edge at the digging wall side in the adjacent slot, and
the processor is further configured to
acquire the second coordinate information and width information indicative of a width of the work implement, and
move the work machine from the current position to the position of the slot edge based on the second coordinate information, and move the work machine from the position of the slot edge to the adjacent slot based on the width information.

5. The system according to claim 1, wherein
the processor is further configured to move the work machine to either one of the adjacent slots based on work information of an other work machine.

6. The system according to claim 1, wherein the processor is further configured to
acquire first path information which indicates a first travel path in order to dig the digging wall, and second path information indicative of a second travel path of at least one of the adjacent slots, and
when the load during digging the digging wall is equal to or greater than the first threshold,
change the travel path of the work machine from the first travel path to the second travel path based on the second path information and
operate the work machine along the second travel path.

7. The work machine according to claim 6, wherein the processor is further configured to
acquire slot information pertaining to at least one of the adjacent slots, and
set the first path information and the second path information based on topography information of the adjacent slot which is included in the slot information.

8. The system according to claim 6, wherein the processor is further configured to
acquire third path information indicative of a third travel path in order to return from the second travel path to the first travel path, and
operate the work machine along the third travel path based on the third path information.

9. The system according to claim 8, wherein
when the load is less than a second threshold, the processor operate the work machine along the third travel path based on the third path information, and
the second threshold is smaller than the first threshold.

10. The system according to claim 8, wherein the processor is further configured to
acquire digging wall information pertaining to the digging wall, and
set the third path information based on height information of the digging wall, the height information being included in the digging wall information.

11. The system according to claim 10, wherein the processor is further configured to
recognize a path change position from the first travel path to the second travel path, and
when the height information is less than a third threshold, cause the work machine to reach the path change position by travelling in reverse in the third travel path.

12. The system according to claim 10, wherein
the processor is further configured to, when the height information is equal to or greater than a third threshold, cause the work machine to reach the path change position by travelling the work machine forward after travelling the work machine in reverse until passing the path change position in the third travel path.

13. A method executed by a processor for controlling a work machine including a work implement, the method comprising:
detecting a load acting on the work implement;
controlling the work machine to dig a digging wall formed between adjacent slots; and
moving the work machine to either one of the adjacent slots adjacent to the digging wall when the load during digging the digging wall is equal to or greater than a first threshold.

14. The method according to claim 13, further comprising:
acquiring movement information in order to change a movement direction of the work machine, and
moving the work machine to either one of the adjacent slots based on the movement information.

15. The method according to claim 14, wherein
the movement information includes first coordinate information indicative of a position of a center line of the adjacent slot, and
the method further comprises:
acquiring the first coordinate information; and
moving the work machine from a current position of the work machine to the center of the adjacent slot based on the first coordinate information when the load during digging the digging wall is equal to or greater than the first threshold.

16. The method according to claim 14, wherein
the movement information includes second coordinate information indicative of a position of a slot edge at a digging wall side in the adjacent slot, and
the method further comprises:
acquiring the second coordinate information and width information indicative of a width of the work implement; and
moving the work machine from the current position to the position of the slot edge based on the second coordinate information, and moving the work machine from the position of the slot edge to the adjacent slot based on the width information.

17. The method according to claim 13, further comprising:
moving the work machine to either one of the adjacent slots based on work information of an other work machine.

18. The method according to claim 13, further comprising:
acquiring first path information indicative of a first travel path in order to dig the digging wall, and second path information indicative of a second travel path of at least one of the adjacent slots, and when the load during digging the digging wall is equal to or greater than the first threshold,
- changing the travel path of the work machine from the first travel path to the second travel path based on the second path information and
- operating the work machine along the second travel path.

19. The method according to claim 18, further comprising:

acquiring slot information pertaining to at least one of the adjacent slots, and setting the first path information and the second path information based on topography information of the adjacent slot included in the slot information.

20. The method according to claim 18, further comprising:

acquiring third path information indicative of a third travel path in order to return from the second travel path to the first travel path, and operating the work machine along the third travel path based on the third path information.

* * * * *